United States Patent [19]

Lin et al.

[11] 4,344,171

[45] Aug. 10, 1982

[54] EFFECTIVE ERROR CONTROL SCHEME FOR SATELLITE COMMUNICATIONS

[75] Inventors: Shu Lin, Honolulu, Hi.; Philip S. Yu, Pleasantville, N.Y.

[73] Assignee: International Business Machines Corporation, Armonk, N.Y.

[21] Appl. No.: 215,489

[22] Filed: Dec. 11, 1980

[51] Int. Cl.³ .............................................. G06F 11/10
[52] U.S. Cl. ......................................................... 371/35
[58] Field of Search ............................... 371/35, 32, 37

[56] References Cited

U.S. PATENT DOCUMENTS

| | | | |
|---|---|---|---|
| 3,413,600 | 11/1968 | Ohnsorge | 371/35 |
| 3,496,549 | 2/1970 | Tong | 371/35 |
| 3,646,518 | 2/1972 | Weinstein | 371/35 |
| 3,868,633 | 2/1975 | Nuese | 371/35 |

OTHER PUBLICATIONS

P. S. Sindhu, Retransmission Error Control with Memory, IEEE Trans. on Comm., vol. Com-25, No. 5, May 1977, pp. 473–479.
Lin and Yu, Preventive Error Control Scheme, IBM Technical Disclosure Bulletin, vol. 24, No. 6, Nov. 1981, pp. 2886–2891.
Lin and Yu, Hybrid Selective-Repeat ARQ with Finite Buffer, IBM Tech. Discl. Bulletin, vol. 24, No. 6, Nov. 1981, pp. 2883–2885.

*Primary Examiner*—Charles E. Atkinson
*Attorney, Agent, or Firm*—Philip Young; Roy R. Schlemmer, Jr.

[57] ABSTRACT

A hybrid scheme for controlling transmission errors in digital data communication systems. Normally, data blocks with a small number of parity digits for error detection are transmitted. When the presence of errors is detected, the retransmissions are not the original data blocks but some properly selected blocks for correcting errors in those erroneously received data blocks which are stored in a buffer at the receiver. The retransmitted blocks are formed based on the original data blocks and error-correcting codes with an invertible property. When such blocks are received, they are used to recover the original data blocks either by an inversion operation or by a decoding process.

18 Claims, 16 Drawing Figures

FIG. 6 TRANSMITTER

RECEIVER

TRANSMITTER

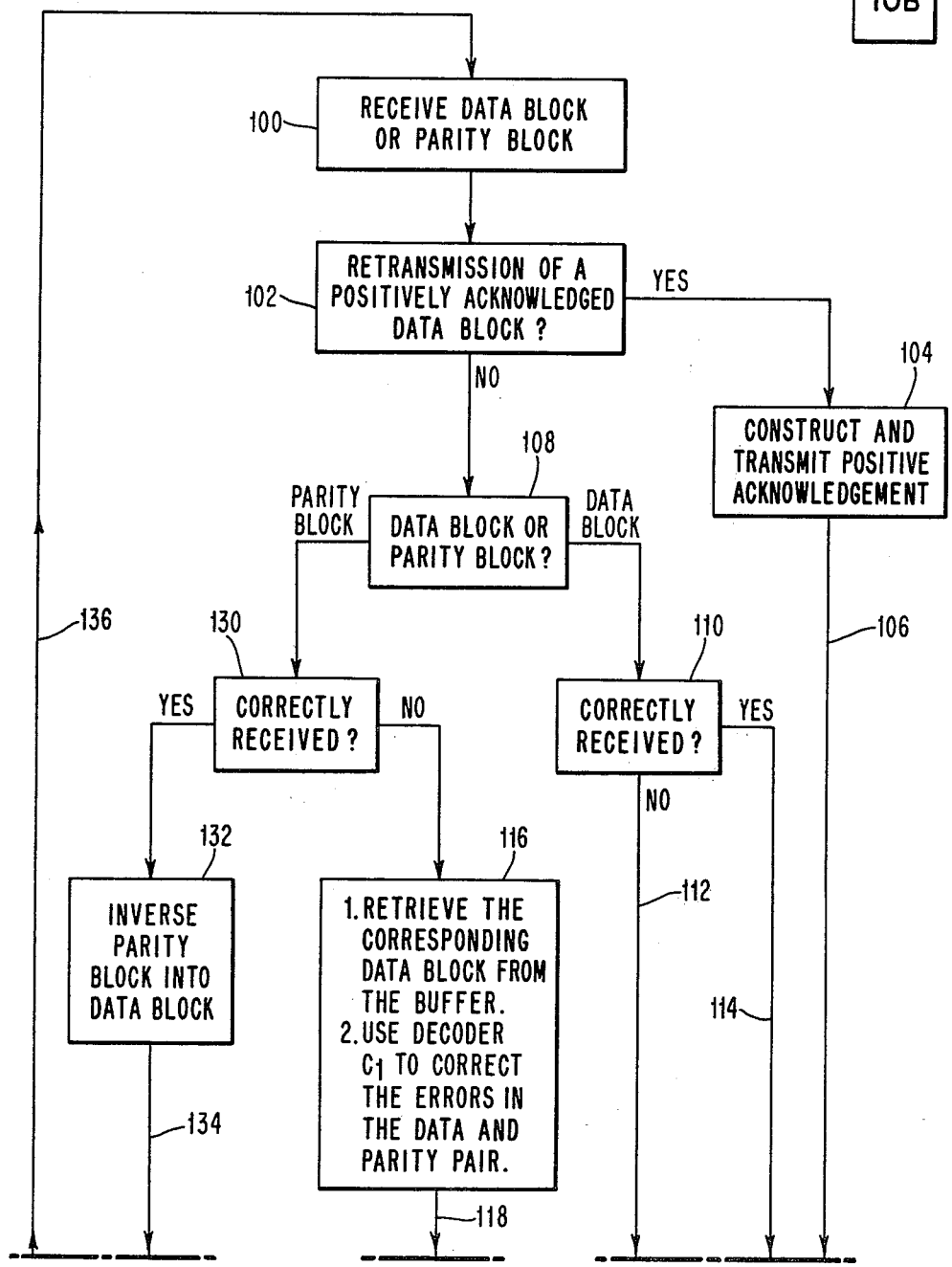

FIG. 11-1 RECOVERY PERIOD OF THE TRANSMITTER USING THE SPREC SCHEME
0 ≤ Z < N

N ≤ Z

EFFECTIVE ERROR CONTROL SCHEME FOR SATELLITE COMMUNICATIONS

BACKGROUND OF THE INVENTION

The present invention relates to digital data communication systems and more particularly to a technique for controlling transmission errors in such systems.

There are basically two known categories of schemes for controlling transmission errors in data communication systems: the automatic-repeat-request (ARQ) scheme and the forward-error-correction (FEC) scheme. The ARQ scheme is widely used because it is simple and it provides high system reliability. However, systems using ARQ scheme have a severe drawback, their throughput falls rapidly with increasing channel error rate. For channels such as satellite channels with large round trip delay, this problem becomes even worse. Systems using the FEC scheme maintain a constant throughput regardless of the channel error rate. However, the FEC scheme is less reliable than the ARQ scheme. Moreover, it is very difficult to implement when a large collection of error patterns is to be corrected.

There are basically three types of ARQ schemes, these being the Stop-and-Wait, Go-Back-N, and Selective Repeat. In any of these three techniques, the receiver sends the sender the results of the error detection in $\overline{D}_j$, $\overline{C}(D_j)$. If no error is detected, a positive acknowledgement (ACK) is sent. Otherwise, a negative acknowledgement (NAK) is sent. The three techniques differ in what the receiver and sender do between the instant the sender has completed transmitting $D_j$ and the instant the sender receives the acknowledgement for $D_j$. In Stop-and-Wait, nothing is done in that period. In selective reject, with a limited number of outstanding packets allowed, transmission of new packets and/or repeat of the packets for which a NAK has been received may occur in that period. In Go-Back-N, the $N-1$ packets which follow $D_j$ are transmitted in that period. Besides the difference described above, these techniques may differ in the length of the interval between the instant a NAK is received (if an error is detected in $\overline{D}_j, \overline{C}(D_j)$ for $D_j$ and the instant $D_j$ is repeated.

Although the Stop-and-Wait ARQ is simple, it is inherently inefficient due to the idle time spent waiting for an acknowledgement for each transmitted data block. This inefficiency becomes unacceptable for systems where transmission rate is high and round trip propagation delay is large, such as in satellite channels. Selective Repeat ARQ is the most efficient scheme among the three types, but has implementation problems such as infinite buffer requirement or buffer overflow, if a buffer of finite size is used. The Go-Back-N ARQ, while being less efficient than the Selective Repeat ARQ, is more efficient than the Stop-and-Wait ARQ and its implementation is simpler than that of the Selective Repeat ARQ.

In a Go-Back-N ARQ system, the transmitter sends data blocks continuously to the receiver and the receiver sends acknowledgements to the transmitter continuously. When a data block is received successfully, a positive acknowledgement (ACK) is sent to the transmitter. However, when a data block is detected in error, a negative acknowledgement (NAK) is sent to the transmitter. On receiving a NAK, the transmitter backs up to the data block that was detected in error at the receiver and retransmits that data block and subsequent data blocks transmitted in the interval between the original transmission and the receipt of the NAK. At the receiver, the data blocks following the erroneously received data blocks are discarded no matter whether they are received correctly or not. This scheme is simple. However, since it usually involved retransmitting good data blocks following an erroneous data block, its efficiency, the maximum achievable throughput, becomes unacceptably low when channel error rate is high and round trip propagation is large.

In a Go-Back-N system, after the last data block has been transmitted, the transmitter stays idle until arrival of the next data block or a NAK of a previously transmitted data block. In a recently proposed Go-Back-N scheme, during the period of time when the transmitter would be normally idle under the Go-Back-N scheme, it repeatedly transmits the last data block. Although such Go-Back-N scheme improves the response time from the data block entering the transmitter until it being output by the receiver, its efficiency is still the same as the basic Go-Back-N ARQ.

It is an object of the present invention to control transmission errors in data communication systems in a simple and efficient manner.

It is another object to control transmission errors in a more efficient and reliable manner than otherwise achieved with the known automatic repeat request (ARQ) and forward error correction (FEC) schemes.

It is a further object to improve transmission efficiency when a data communication channel is very noisy and the round trip propagation delay is large.

SUMMARY OF THE INVENTION

These and other objects are achieved by the present invention which provides a method for controlling transmission errors in digital data communication systems including transmitting data blocks with a small number of parity bits for error detection and, when the presence of errors is detected, retransmitting properly selected parity blocks for correcting errors in the erroneously received data blocks which are stored in a buffer at the receiver. The parity blocks are formed based on a half-rate invertible code. A code is said to be invertible if, knowing only the parity digits of a code word, the corresponding information digits can be uniquely determined by an inversion process. Hence, if the parity blocks are received correctly during the retransmission cycle, the original data blocks can be recovered by a simple inversion process without going through a more complicated decoding process. However, if the parity blocks are not received successfully, they will be used to correct errors in the erroneous data blocks previously received. Using this method, high system efficiency and reliability can be achieved even when the channel error rate is high and the round trip propagation delay is large.

DESCRIPTION OF THE PREFERRED EMBODIMENTS

Figure 1:
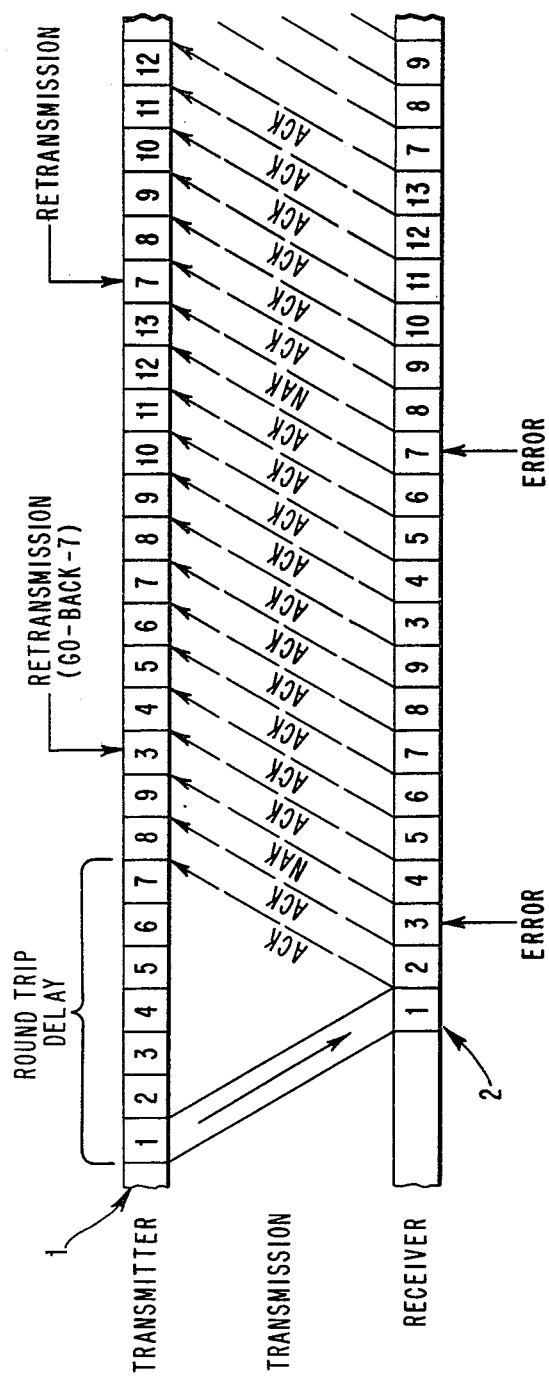
FIG. 1 shows the data blocks at a transmitter and a receiver for a conventional automatic-repeat-request (ARQ) scheme.

In order to simplify the understanding of the subject invention, there will be first be described the conventinal Go-Back-N ARQ illustrated in FIG. 1. Using the conventional Go-Back-N ARQ, the transmitter sends data blocks 1 continuously to the receiver and the receiver sends acknowledgements to the transmitter continuously. When a data block 2 is received successfully, a positive acknowledgement (ACK) is sent to the transmitter. However, when a data block is detected in error, a negative acknowledgement (NAK) is sent to the transmitter. On receiving a NAK, the transmitter backs up to the data block that was detected in error at the receiver and retransmits that data block and the subsequent N−1 data blocks transmitted in the interval between the original transmission and the receipt of the NAK as in FIG. 1. In the FIG. 1 example, N=7. At the receiver, the N−1 data blocks following the erroneously received data block are discarded no matter whether they are received correctly or not. This scheme usually involves retransmitting good data blocks following an erroneous data block, and becomes very inefficient when channel error rate is high and the round trip delay is large.

The performance of an error control scheme is measured by its throughput and reliability (or error probability). The throughput is defined as the ratio of the average number of data blocks accepted by the receiver per unit of time to the number of data blocks that could be transmitted per unit of time if no transmission errors occur. Let p be the probability that a data block is successfully received. The probability p consists of two parts, the probability $P_c$ that a data block is received without errors and the probability $P_e$ that a data block is received with undetectable errors i.e., $p = P_3 + P_c$. The throughput of the conventional Go-Back-N ARQ is given as the following:

$$\eta_{GBN} = \frac{p}{p + (1-p)N}. \quad (1)$$

It is noted that the feedback channel is assumed to be noiseless and the overhead due to the parity bits of each block is ignored. The reliability of an ARQ scheme is measured by the probability that the receiver accepts a data block with undetectable errors. Let $P_{ARQ}(\xi)$ denote this error probability. Then, we have $$P_{ARQ}(\xi) = P_e/(P_e + p_c). \quad (2)$$

The probability $P_e$ depends on the error-detecting code being used in the ARQ system. If an (n,k) linear code is used for a binary symmetric channel (BSC) with transition probability $\epsilon$, $P_e$ is upper bounded by $$P_e \leq 2^{-(n-k)}[1-(1-\epsilon^n)]. \quad (3)$$

Generally, $2^{-(n-k)}$ is used as an upper bound on $P_e$ for both channels with random or burst errors. If the error detecting code is chosen properly, $P_e$ can be made very small. Consequently, the error probability $P_{ARQ}(\xi)$ becomes very small.

The subject invention provides using a hybrid ARQ technique using selective parity retransmissions hereinafter referred to as SPREC. The SPREC technique employs two codes, $C_0$ and $C_1$. The code $C_0$ is a high rate (n,k) cyclic (or shortened cyclic) code which is used for error detection only. Such a code is used in every type of ARQ for checking the validity of data blocks and can be implemented easily with a feedback shift register. Both cyclic and polynomial codes are described in U.S. Pat. No. 3,872,430 issued on Mar. 18, 1975 to P. E. Boudreau et al. The second code $C_1$ is an invertible half rate (2k,k) code which is capable of correcting t or fewer transmission errors and simultaneously detecting d(d>t) or fewer errors. For bursty channel, $C_1$ would be a burst-error correcting and detecting code.

A data block, denoted by (D,Q) consists of two parts, D and Q. The part D consists of k information digits and the part Q consists of n−k parity digits which are formed based on the information block D and the (n,k) code $C_0$. Thus, (D,Q) is a code word in $C_0$. When a data block is received, the parity digits are used to check the validity of the block (i.e., error detection).

When a received data block, denoted by $(\overline{D},\overline{Q})$, is detected in error, the receiver requests for a retransmission. The erroneous information block $\overline{D}$ is saved in a buffer. The retransmission is not the original data block (D,Q) but a parity block of n digits, denoted by $P(D),Q^{(1)})$, which consists of two parts, P(D) and $Q^{(1)}$. The first part P(D) consists of k parity digits which are formed based on the original k information digits D and the half rate (2k,k) invertible code $C_1$. Hence, (D,P(D)) is a code word in $C_1$. The second part $Q^{(1)}$ consists of n−k parity digits checking on P(D). These n−k parity digits are formed based on P(D), regarded as k information digits, and the (n,k) code $C_0$. Clearly $(P(D),Q^{(1)})$ is code word in $C_0$.

When a parity block is received, denoted by $(\overline{P(D)},\overline{Q}^{(1)})$, the part $\overline{Q}^{(1)}$ is used to check the validity of P(D). If no errors being detected, $\overline{P(D)}$ is used to recover the original data block D by an inversion process. If the presence of errors is detected, then $\overline{P(D)}$ and the previously received data block $\overline{D}$ together are used for error correction based on the decoding rule of code $C_1$. If the total number of errors $\overline{D}$ and $\overline{P(D)}$ does not exceed t, the errors in $\overline{D}$ will be corrected. However, if the number of errors in $\overline{D}$ and $\overline{P(D)}$ exceeds t but does not exceed d, errors will be detected. In this case, another retransmission is requested. The retransmission is again a parity block $(P(D),Q^{(1)})$. Retransmissions continue until the original data D is recovered either by inversion or by a decoding operation.

Figure 2:
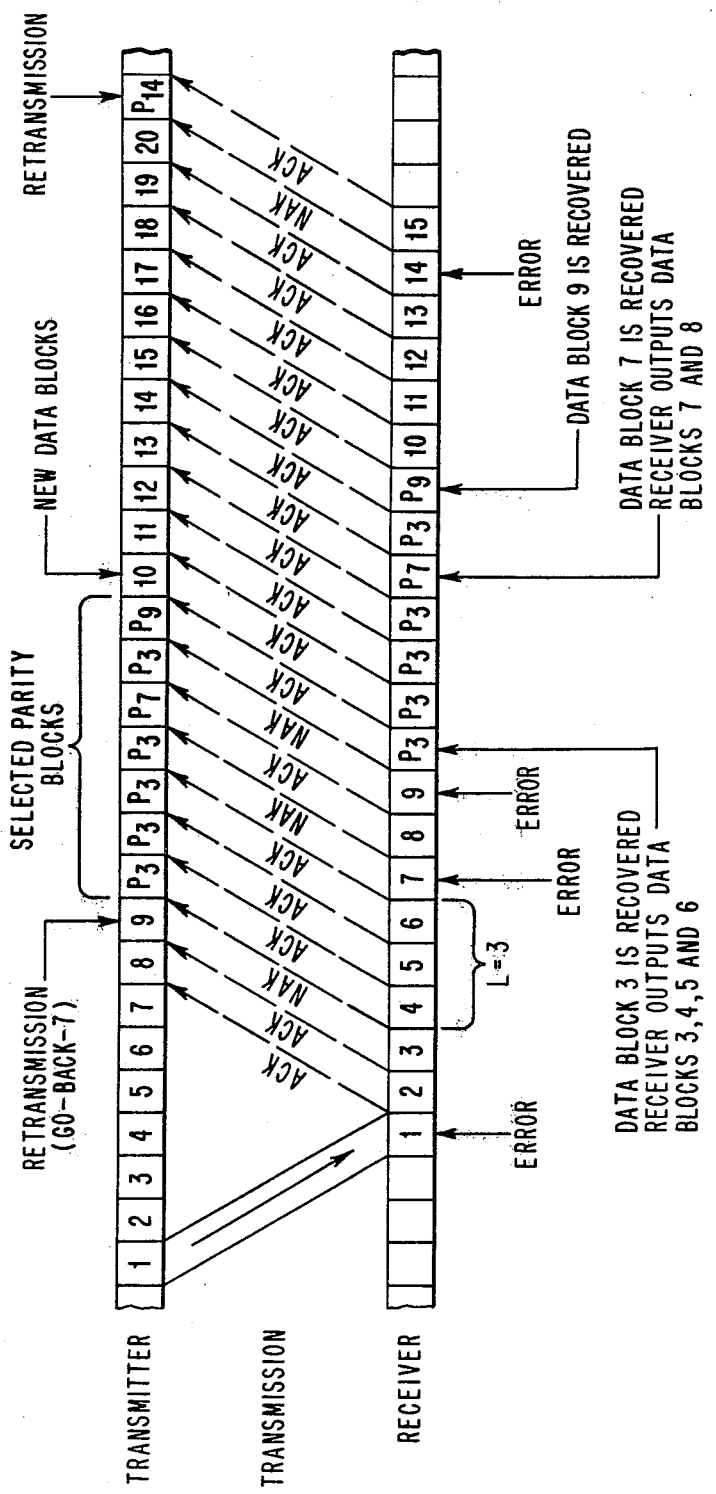
FIG. 2 shows the data block arrangement at a transmitter and a receiver for the selective parity retransmission (SPREC) scheme in accordance with the present invention.

In the description of the selective parity retransmission (SPREC) scheme of the present invention, for the convenience of presentation, the $n-k$ error detecting parity digits is dropped from each data block and from each parity block. That is, $(D,Q)$ and $(P(D),Q^{(1)})$ are represented by D and $P(D)$ respectively. The SPREC scheme is illustrated in FIG. 2.

In a normal operation, the transmitter continuously sends data blocks to the receiver. The receiver checks the validity of each incoming data block based on error detecting code $C_0$, and sends an acknowledgement to the transmitter for each received block. When the channel is quiet, the transmission proceeds smoothly and error-free data blocks are delivered to the user continuously.

When the first received data block $D_j$ is detected in error, a NAK(j) is sent to the transmitter and the erroneous data block $D_j$ is save in a buffer. The receiver proceeds to check the validity of the subsequent $N-1$ received data blocks and stores them in the buffer. Upon receiving the NAK(j), the transmitted stops transmitting new data blocks, it backs up N blocks to $D_j$ (i.e., Go-Back-N) and starts retransmissions. In the FIG. 2 embodiment, $N=7$. The retransmissions are not the N original data blocks $D_j, D_{j+1}, \ldots, D_{j+N-1}$, but the parity block $P(D_j)$ and $N-1$ properly selected parity blocks. The selection for retransmission is carried out in the following manner. For $j < l < j+N$, if the data block $D_l$ is not successfully received by the receiver, the transmitter sends the parity block $P(D_l)$ upon receiving the NAK(l). If $D_l$ is successfully received by the receiver, the transmitter, upon receiving ACK(l), does not send $P(D_l)$ but uses the time slot to repeat the parity block $P(D_j)$. The main idea is to use the time slots corresponding to the successfully received data blocks following the first erroneously received data block $D_j$ to send the parity block $P(D_j)$. This transmission of $P(D_j)$ and $N-1$ properly selected parity blocks is referred to as the first retransmission cycle. When these parity blocks are received, they are used to recover $D_j$ and other data blocks erroneously received. In FIG. 2, data blocks 3, 7, and 9 are recovered as shown.

Figure 3:
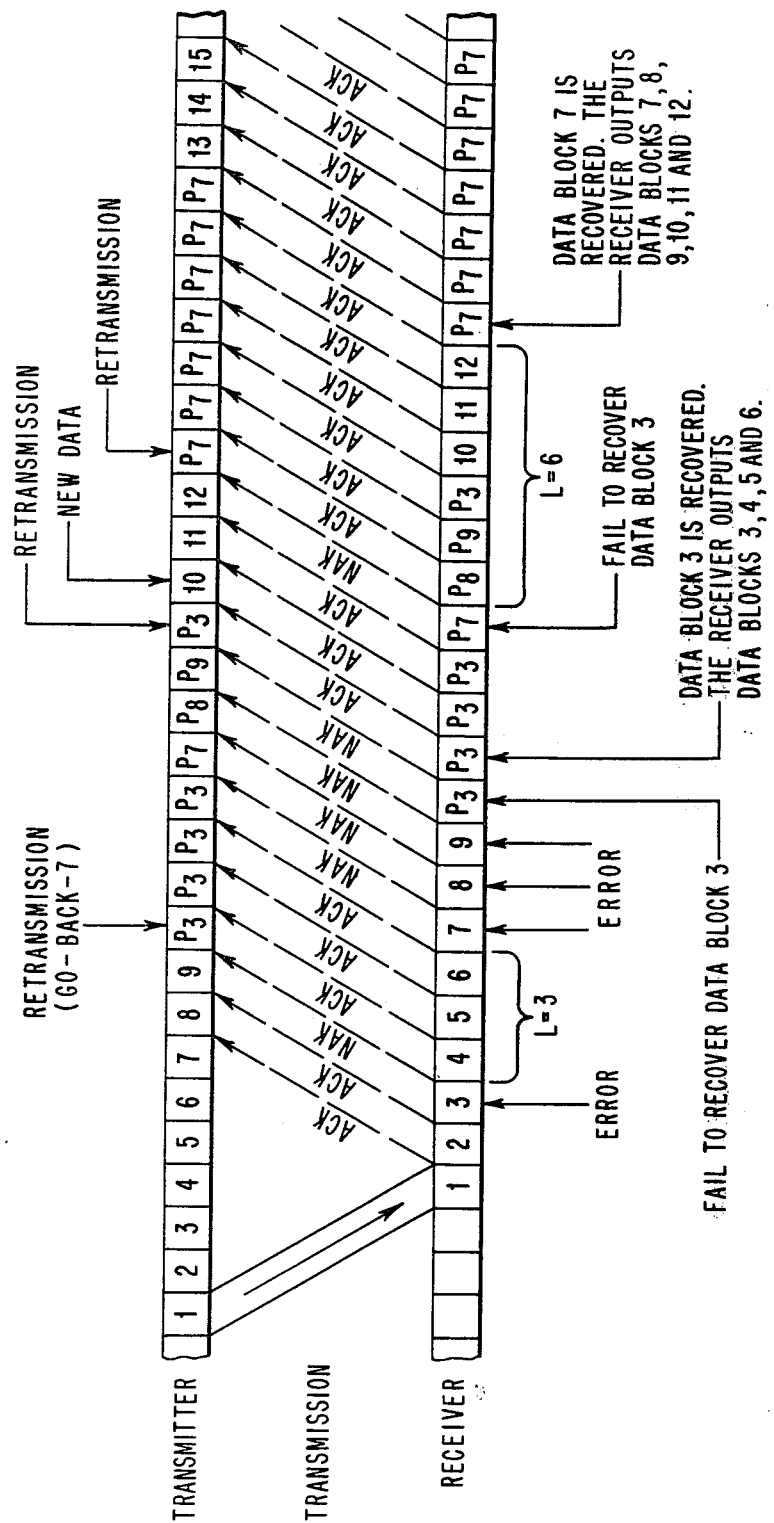
FIGS. 3 and 4 show a data and parity block arrangement at a transmitter and a receiver where two retransmission cycles are involved in the scheme of the present invention.
Figure 4:
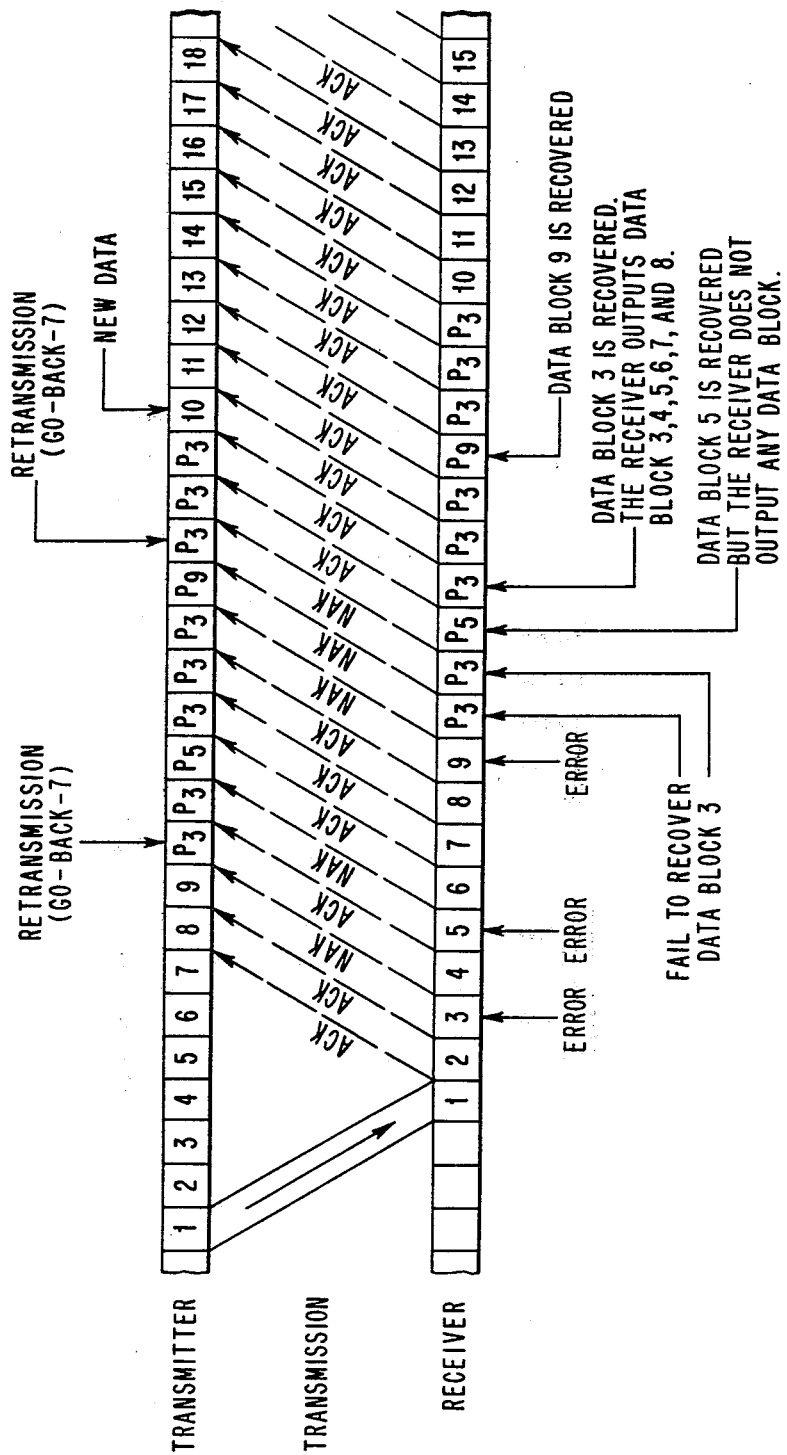

If the receiver fails to recover $D_j$ from the first parity block $P(D_j)$ transmitted in the first retransmission cycle, it notifies the transmitter to start the second retransmission cycle. The first block in the second retransmission cycle is again the parity block $P(D_j)$. The subsequent retransmitted blocks are parity blocks selected in a proper manner. The second retransmission cycle will be terminated as soon as the transmitter is notified that $D_j$ has been recovered by a parity block $P(D_j)$ transmitted in the first retransmission cycle. The parity blocks in the second retransmission cycle are selected in the following manner. If a parity $P(D_j)$ transmitted in the first retransmission cycle fails to recover $D_j$, the transmitter, up on receiving a notification (NAK(j)), repeats $P(D_j)$ in the second transmission cycle, as illustrated in FIG. 3. For $j < l < j+N$, if an erroneously received data block $D_l$ is not successfully recovered by its parity block $P(D_l)$ transmitted in the first retransmission cycle, the transmitter repeats $P(D_l)$ in the second retransmission cycle. If $D_l$ is recovered by $P(D_l)$ but $D_j$ has yet been recovered, the time slot corresponding to $D_l$ during the second retransmission cycle will be used to send $P(D_j)$ as illustrated in FIGS. 3 and 4. Since $D_j$ may be recovered by a $P(D_j)$ in the middle of the first retransmission cycle, the transmitter may stop retransmission in the middle of the second retransmission cycle. Hence, as shown, the second retransmission cycle may consist of less than N parity blocks, i.e., it may not be a complete cycle. If the receiver fails to recover $D_j$ from the parity blocks $P(D_j)$ transmitted in the first retransmission cycle, the transmitter will complete the second retransmission cycle.

If the receiver fails to recover $D_j$ from the first parity block $P(D_j)$ in the second retransmission cycle, it will instruct the transmitter to start the third retransmission cycle. The parity blocks are selected in the same manner as that in the second retransmission cycle. The third retransmission cycle will be terminated as soon as the transmitter is notified of the recovery of $D_j$. Retransmission cycles continue until the first erroneously received data block $D_j$ has been recovered. The data recovery procedure can be explained by letting L be the number of consecutive data blocks which are successfully received between the first erroneously received data block $\overline{D}_j$ and the next erroneously received data block $\overline{D}_{j+L+1}$ with $0 \leq L \leq N-1$. If $1+N-1$, then all the $N-1$ data blocks following $\overline{D}_j$ are successfully received. Therefore, the first $L+1$ consecutive parity blocks are $P(D_j)$ during the first retransmission cycle.

When the first parity block $\overline{P}(D_j)$ is received, its validity is checked. If $\overline{P}(D_j)$ is successfully received, the data block $D_j$ is recovered from $\overline{P}(D_j)$ by an inversion process. If $\overline{P}(D_j)$ is detected in error, then $\overline{P}(D_j)$ and the erroneous data block $\overline{D}_j$ (stored in the buffer) together are used for correcting errors in $\overline{D}_j$ based on the decoding rule of $C_1$. Once $D_j$ is recovered, the receiver outputs the $L+1$ good data blocks, $D_j, D_{j+1}, \ldots, D_{j+L}$. At the same time, the receiver sends $L+1$ consecutive ACK's to the transmitter and ignores the next L incoming parity blocks which are $\overline{P}(D_j)$. Upon receiving these ACK's, the transmitter starts to send new data blocks $D_{j+N}, D_{j+N+L}, \ldots$, as shown in FIG. 2.

If the receiver fails to recover the data block $D_j$ from the first received parity block $\overline{P}(D_j)$, a NAK(j) is again sent to the transmitter. If $L \geq 1$, the next received parity block is also $\overline{P}(D_j)$. Upon receiving this parity block, the receiver repeats the same process to recover $D_j$. If $D_j$ is successfully recovered from the second $\overline{P}(D_j)$, the receiver outputs data blocks $D_j, D_{j+1}, \ldots, D_{j+L}$. This time, the receiver issues L consecutive ACK's to the transmitter and ignores the next $L-1$ incoming parity blocks which are $\overline{P}(D_j)$. Upon receiving these L-ACK's, the transmitter starts to sends new data blocks, $D_{j+N}, D_{j+N+1}, \ldots, D_{j+N+L-1}$, as shown in FIG. 3. Note that, since the receiver fails to recover $D_j$ from the first received parity block $\overline{P}(D_j)$, the transmitter has repeated the parity block $P(D_j)$ before sending new data blocks $D_{j+N}, D_{j+N+1}, \ldots$. When this parity is received, it will be ignored and an ACK will be sent to the transmitter. If the half-rate code $C_1$ is powerful enough, $D_j$ will be recovered by the first received parity block $\overline{P}(D_j)$ with high probability. If the first received parity block $\overline{P}(D_j)$ fails to recover $D_j$, the second received parity block $\overline{P}(D_j)$ should be able to recover $D_j$. The probability that both the first and second $\overline{P}(D_j)$ fail to recover $D_j$ is very small. The above process continues until $D_j$ is recovered by a received parity block $\overline{P}(D_j)$.

If the receiver fails to recover $D_j$ when the parity block $\overline{P}(D_{j+L+1})$ for the next erroneous data block $D_{j+L+1}$ arrives, the receiver swithces to recover $D_{j+L+1}$ from $\overline{P}(D_{j+L+1})$. No matter whether $D_{j+L+1}$ is recovered or not, if the next received parity block is $\overline{P}(D_j)$, the receiver again attempts to recover $D_j$, as shown in FIG. 4. As soon as $D_j$ has been successfully recovered, the receiver starts to output good data blocks $D_j, D_{j+1}, \ldots$ in consecutive order and the transmitter is instructed to send new data blocks until the next NAK is received.

Using SPREC technique of the present invention, the receiver will not output any data block and the transmitter will not be instructed to send new data blocks until the earliest erroneous data block $D_j$ has been recovered. Unless the channel error rate is very high, the erroneous data blocks, especially the earliest one, will be recovered in the first retransmission cycle with high probability. If a NAK(l) for the data block $D_l$ is received while the transmitter is sending new data blocks, the transmitter will initiate the first retransmission cycle for $D_l$ no matter whether the parity block $P(D_l)$ has been transmitted before or not.

Figure 5:
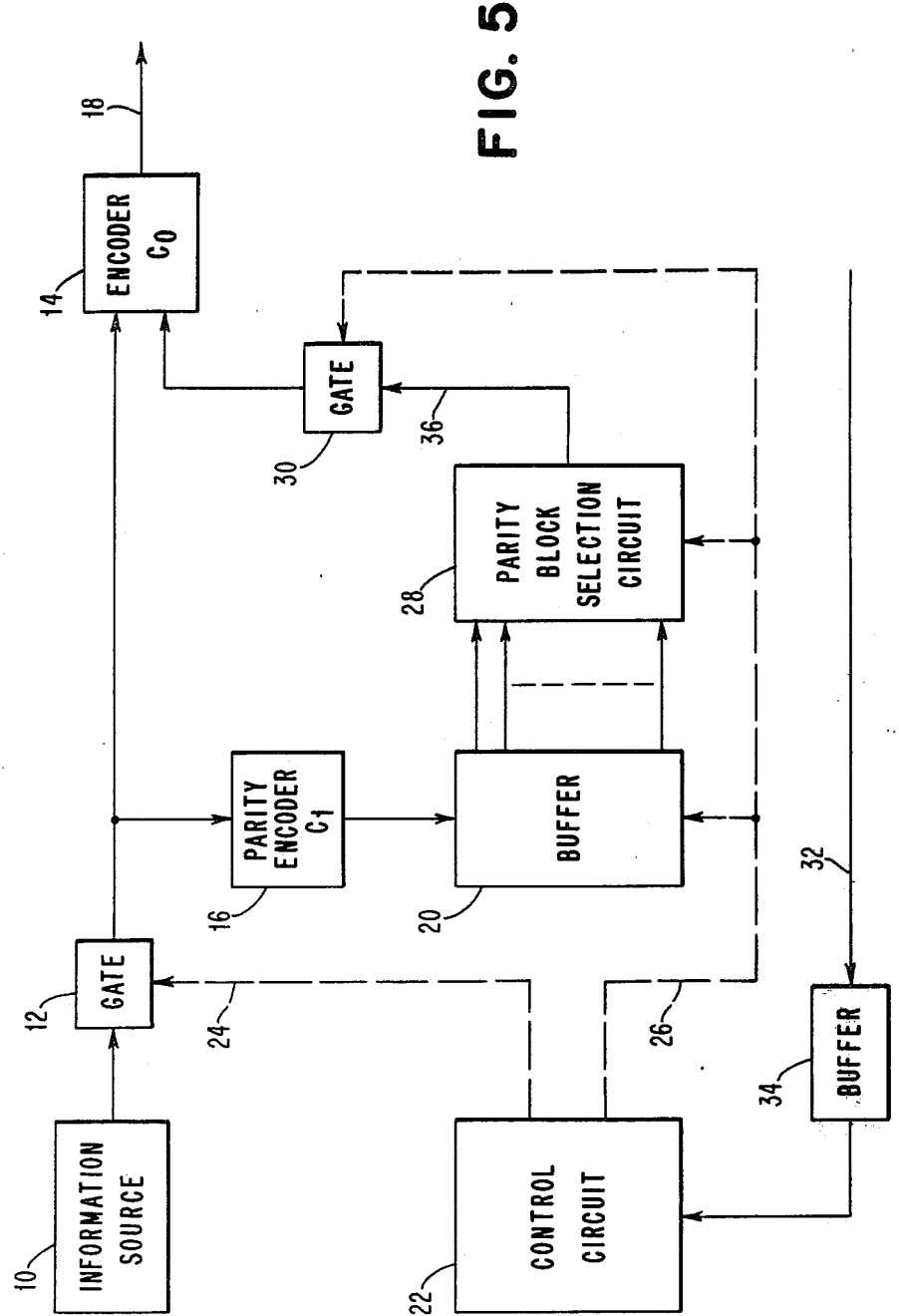
FIG. 5 is a system block diagram of the transmitter of the present invention.

Referring to FIG. 5, there is shown a system block diagram of the SPREC transmitter. As described above, a data block consists of information digits and parity digits based on the information block D and the (n,k) code $C_0$. An information source 10 provides the information digits via a gate 12 as information digits $D_i$ to both a $C_0$ encoder 14 and a $C_1$ parity encoder 16. As mentioned above, the code $C_0$ is a high-rate (n,k) cyclic or shortened cyclic code which is used for error detection only. The second code $C_1$ is an invertible half-rate (2k,k) code which is capable of correcting t or fewer transmission errors and simultaneously detecting d (d>t) or fewer errors. The encoder 14 encodes the data block $D_i$ by $C_0$ and then transmits the encoder data on channel 18.

The parity encoder 16 encodes the data by the code $C_1$ to form its parity block $P(D_i)$ and stores it in a buffer 20 where its address is determined by a sequenced number.

A control circuit 22 provides data transmission control for gating information through the gate 12 by means of control signals on line 24, and also provides parity retransmission control on line 26 to a buffer 20 a parity block selection circuit 28 and a gate 30. Acknowledgements are received on feedback line 32 from the channel 18 and stored in a feedback buffer 34. If the feedback acknowledgements are positive (ACK) or negative (NAK), the control circuit will operate accordingly. More specifically, during normal transmission, if a positive acknowledgement is received, a new data block is formed from the information source 10, a parity code $C_1$ is stored in the buffer 20 and the data block is transmitted via the $C_0$ encoder 14. During the recovery phase if a positive acknowledgement (ACK) has been received on line 32, the control circuit 22 causes the parity block selection circuit 28 to transmit from the buffer 20 the parity block of the earliest data block which has not been positively acknowledged. This parity block $P(D_j)$ is outputted on line 36 through the gate 30 to the encoder 14 which sends the parity block denoted by P(D),Q.

On the other hand, if a negative acknowledgement (NAK) of a not yet positively acknowledged block is received, the control circuit 22 and the parity block selection circuit 28 employ a sequence number or address to obtain from the buffer 20 the parity block corresponding to the negatively acknowledged data.

In this sytem, the receiver will not output any data block and the transmitter will not be instructed to send new data blocks until the earliest erroneous data block $D_j$ has been recovered. Thus, the positive acknowledgement will cause transmission of the parity block of the earliest data block which has not been positively acknowledged.

Figure 6:
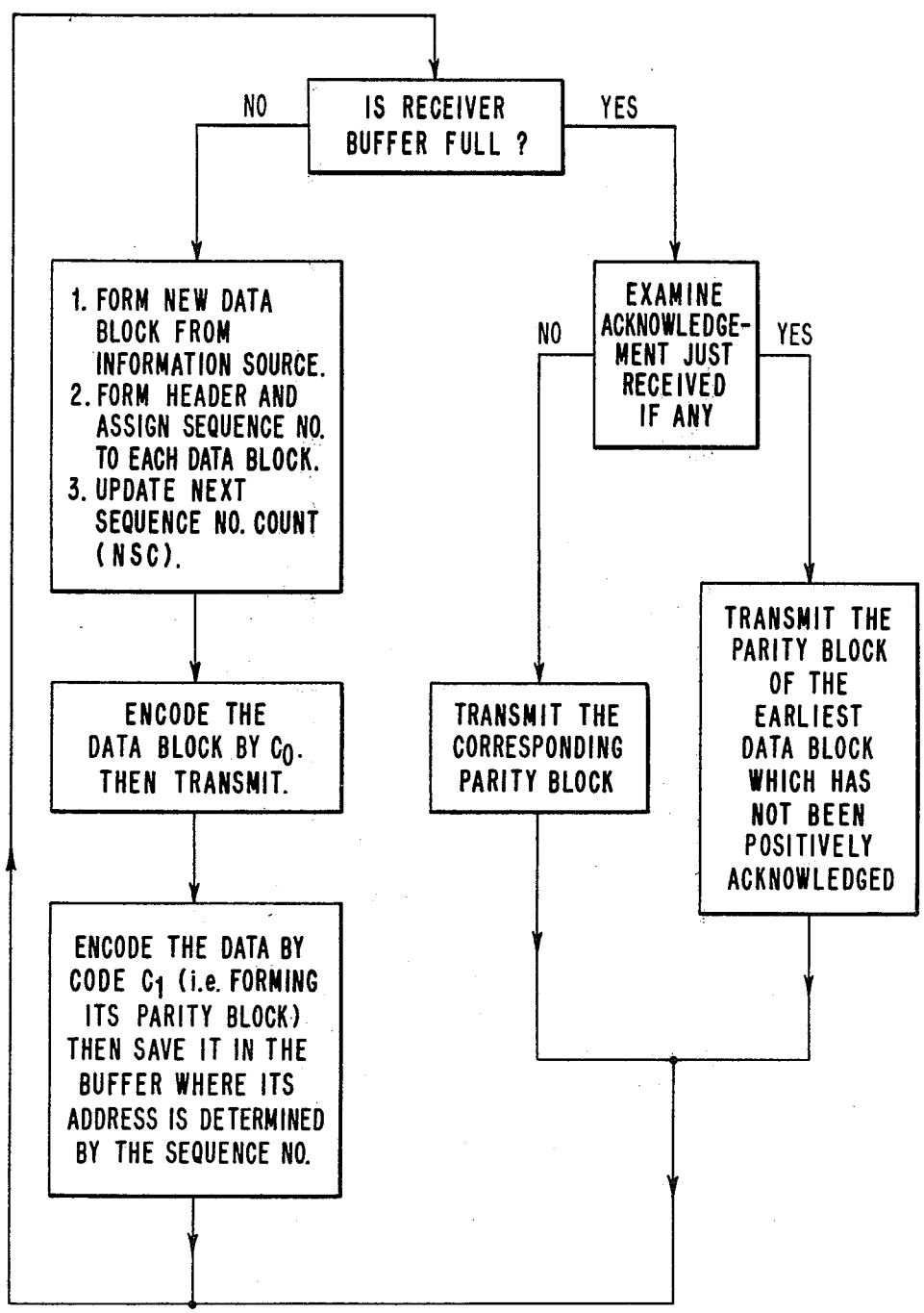
FIG. 6 is a system flow diagram for the transmitter shown in FIG. 5.
Figure 7:
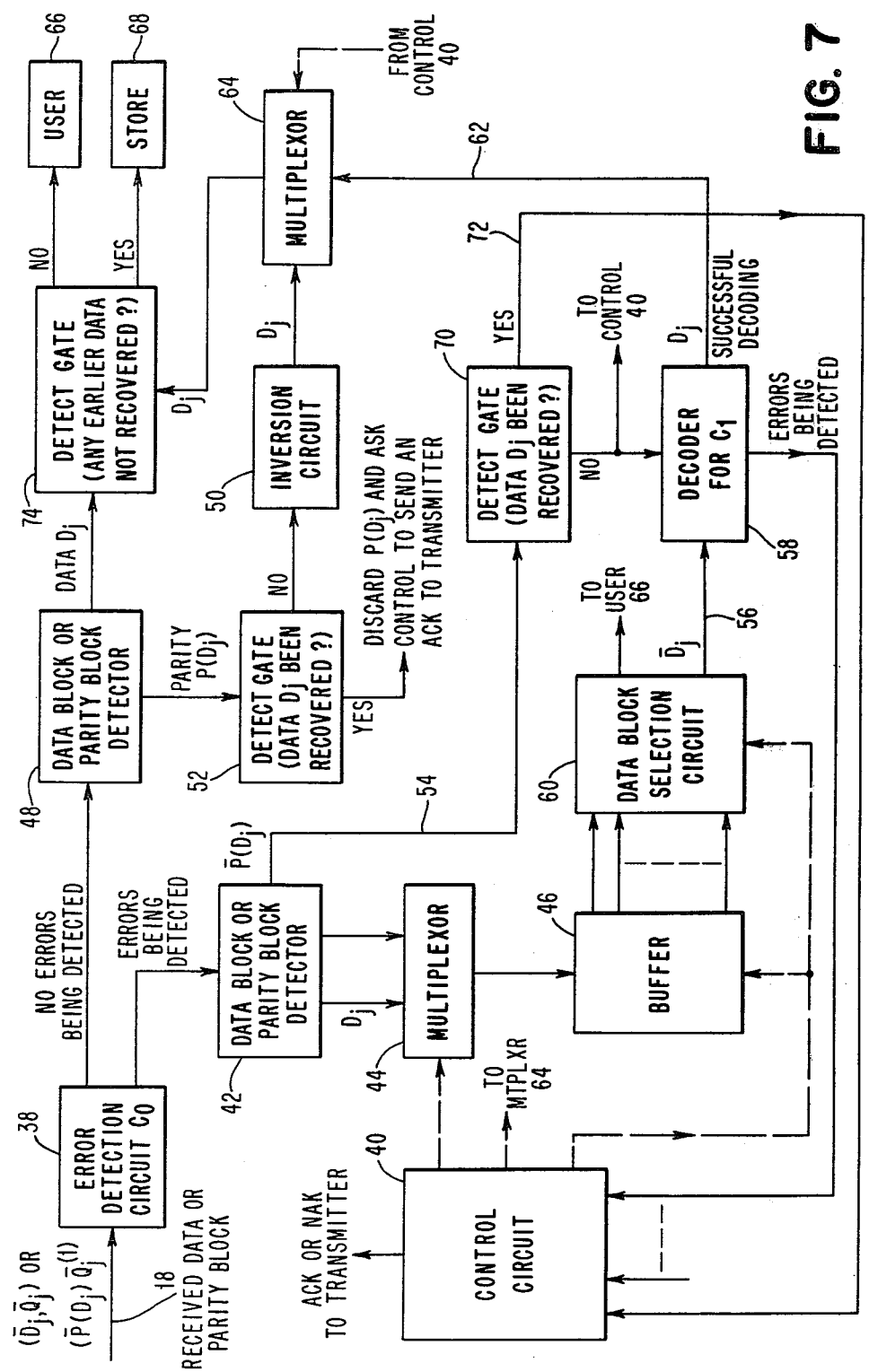
FIG. 7 is a system block diagram of the receiver of the present invention.
Figure 8:
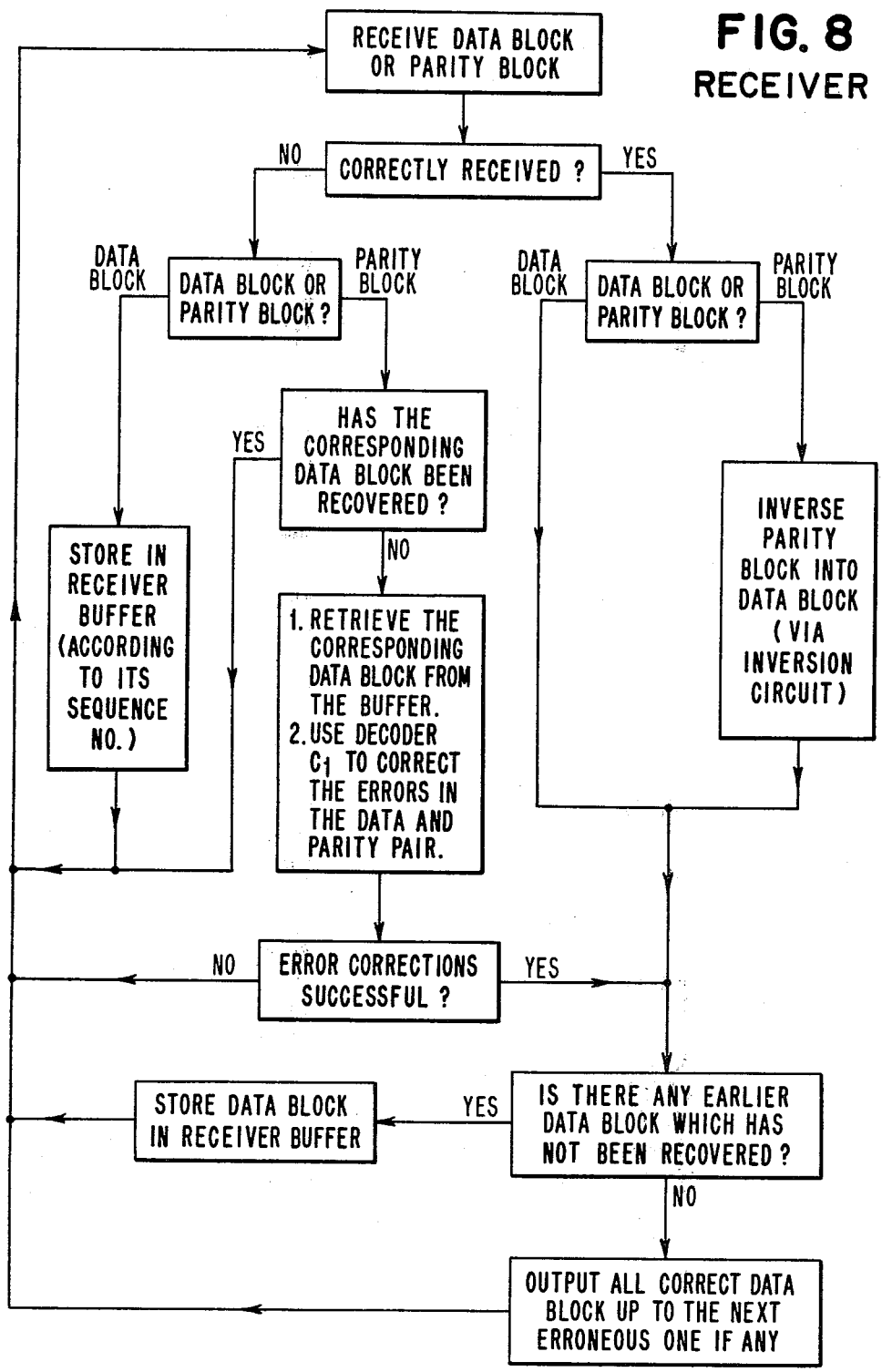
FIG. 8 is a flow diagram corresponding to the operation of the receiver shown in FIG. 7.

Referring to FIG. 6, there is shown a system flow diagram for the transmitter shown in FIG. 5. Here, the operation of the transmitter shown and described with reference to FIG. 5 is disclosed in a flow diagram form. Referring to FIG. 7, there is shown a system block diagram of the SPREC receiver. FIG. 8 is a flow diagram corresponding to the operation of the receiver shown in FIG. 7. The data or parity block is received on the transmission channel 18 in an error detection circuit $C_0$ indicated by numeral 38 which checks the validity of the data block $\overline{D}, \overline{Q}$ by using the parity digits which, as mentioned above, are formed based on the information block D and the code $C_0$. When a received data block is detected in error by detector 38, the receiver requests for a retransmission by means of the control circuit 40. A detector 42 determines if the received data is a data block or a parity block and, the erroneous information block $\overline{D}$ is passed through a multiplexor 44 and stored in a buffer 46. As described above, the retransmission is not the original data block (D,Q), but a parity block of n digits, denoted by $P(D),Q^{(1)}$, which consists of the parts P(D), and $Q^{(1)}$.

On the other hand, when a parity block is received, the detector 38 uses the part $\overline{Q}^{(1)}$ to check the validity $\overline{P}(D)$. If no errors are detected in detector 38, the parity digits $\overline{P}(D)$ is used to recover the original data block D by means of an inversion circuit 50 once the detector 42 indicates a parity block. If the data D1 has been recovered, the parity P(D) is discarded when so indicated by a detector 48 and the control circuit 40 sends an acknowledge (ACK) to the transmitter.

If the presence of errors is detected by detector 38, then the parity digits $\overline{P}(D)$ and the previously received data block $\overline{D}$ are together used for error correction, as shown by lines 54 and 56 leading into a decoder 58 for $C_1$. This error correction is based on the decoding rule of code $C_1$ and is conventional decoding as indicated above. Again, where the errors are detected in the parity block, the corresponding data block is retrieved from the buffer 46 by means of the control circuit 40 and a data block selection circuit 60 and the $C_1$ decoder 58 attempts to correct the errors in the data and parity blocks. Retransmissions continue until the original data is recovered either by inversion or by decoding where it is placed via line 62 through a multiplexor 64 for subsequent use by a user 66 or for storage at 68 at a proper location in the buffer 46.

When a detector 70 indicates that the data $D_j$ has been recovered, a signal is provided on line 72 to the control circuit 40 to provide a positive acknowledgement (ACK).

If no errors were detected in the data block or the parity block, or if error correction has been successful, then a form of AND gate 74 causes the data block to be stored via the store 68 into the receiver buffer 46 if there is any earlier data that has not been recovered. On the other hand, if all earlier data has been recovered, then the data block is passed on to the user 66.

The flow diagram of FIG. 8 shows the operations of the control circuit 40 with the receiver elements shown in FIG. 7.

In normal operation, the trasmitter, shown in FIG. 5, sends data blocks via channel line 18 to the receiver continuously. The receiver, shown in FIG. 7, checks the validity of each incoming data block based on error detecting code $C_0$, and sends acknowledgement to the transmitter of each received block. When a received data block is detected in error, a negative acknowledgement (NAK) is sent to the transmitter and the erroneous data block is saved in buffer 46. The receiver proceeds to check the validity of the subsequent $N-1$ received data blocks and stores them in buffer 46.

Upon receiving the NAK, the transmitter backs up N blocks to $D_j$ (i.e., Go-Back-N) and starts retransmissions. The retransmissions are not the N original data blocks, but the parity block $P(D_j)$ and $N-1$ properly selected parity blocks taken by the parity block selection circuit 28. The selection is carried out in the following manner: If the data block $D_{j+1}$ is successfully received by the receiver, the transmitter does not send $P(D_{j+1})$ but uses the time slot to repeat the parity block $P(D_j)$. However, if the data block $D_{j+1}$ is not successfully received, the transmitter sends the parity block $P(D_{j+1})$. This parity block selection process continues for the subsequent $N-2$ retransmissions.

Let L be the number of consecutive data blocks which are successfully received between the first erroneously received data block $\overline{D}_j$ and the next erroneously received data block $\overline{D}_{j+L+1}$ with $0 \leq L \leq N-1$ (if $L=N-1$, then all the $N-1$ data blocks following $\overline{D}_j$ are successfully received). Therefore, the first $L+1$ consecutive parity blocks are $P(D_j)$ during the first retransmission cycle (sending $P(D_j)$ and $N-1$ properly selected parity blocks described above is referred to as retransmission cycle). If p is the probability that a block will be received successfully, then there are, on average, pN parity blocks $P(D_j)$ during the first retransmission cycle.

When the first parity block is received, its validity is checked. If successfully received, the data block $D_j$ is recovered from the parity block by inverter 50. If the parity block is detected in error, then it and the erroneous data block stored in the buffer 46 together are used for correcting errors in the data block by the $C_1$ decoder 58. Once $D_j$ is recovered, the receiver outputs the $L+1$ good data blocks $D_j, D_{j+1}, \ldots, D_{j+L}$. At the same time, the receiver sends $L+1$ consecutive ACK's (positive acknowledgements) to the transmitter and ignores the next L incoming parity blocks which are $\overline{P}(D_j)$. Upon receiving these ACK's, the transmitter starts to send new data blocks $D_{j+N}, D_{j+N+1}, D_{j+N+L}, \ldots$. If the receiver fails to recover the data block $D_j$ from the first receiver parity block $\overline{P}(D_j)$, a NAK(j) is again sent to the transmitter. If $L \geq 1$, the next received parity block is also $\overline{P}(D_j)$. Upon receiving this parity block, the receiver repeats the same process to recover $D_j$. If $D_j$ is successfully recovered from the second $\overline{P}(D_j)$, the receiver outputs data blocks $D_j, D_{j+1}, \ldots, D_{j+L}$. This time, the receiver issues L consecutive ACK's to the transmitter and ignores the next $L-1$ incoming parity blocks which are $\overline{P}(D_j)$. Upon receiving these L ACK'a, the transmitter starts to send new data blocks $D_{j+N}, D_{j+N+1}, \ldots, D_{j+N+L-1}, \ldots$.

If the receiver fails to recover $D_j$ when the parity block $\overline{P}(D_{j+L+1})$ for the next erroneous data block $\overline{D}_{j+L+1}$ arrives, the receiver switches to recover $D_{j+L+1}$ from $\overline{P}(D_{j+L+1})$. No matter whether $D_{j+L+1}$ is recovered or not, if the next received parity block is $\overline{P}(D_j)$, the receiver again attempts to recover $D_j$. As soon as $D_j$ has been successfully recovered, the receiver starts to output good data blocks $D_j, D_{j+1}, \ldots$ in consecutive order and the transmitter is instructed to send new data blocks until the next NAK is received.

Figure 9:
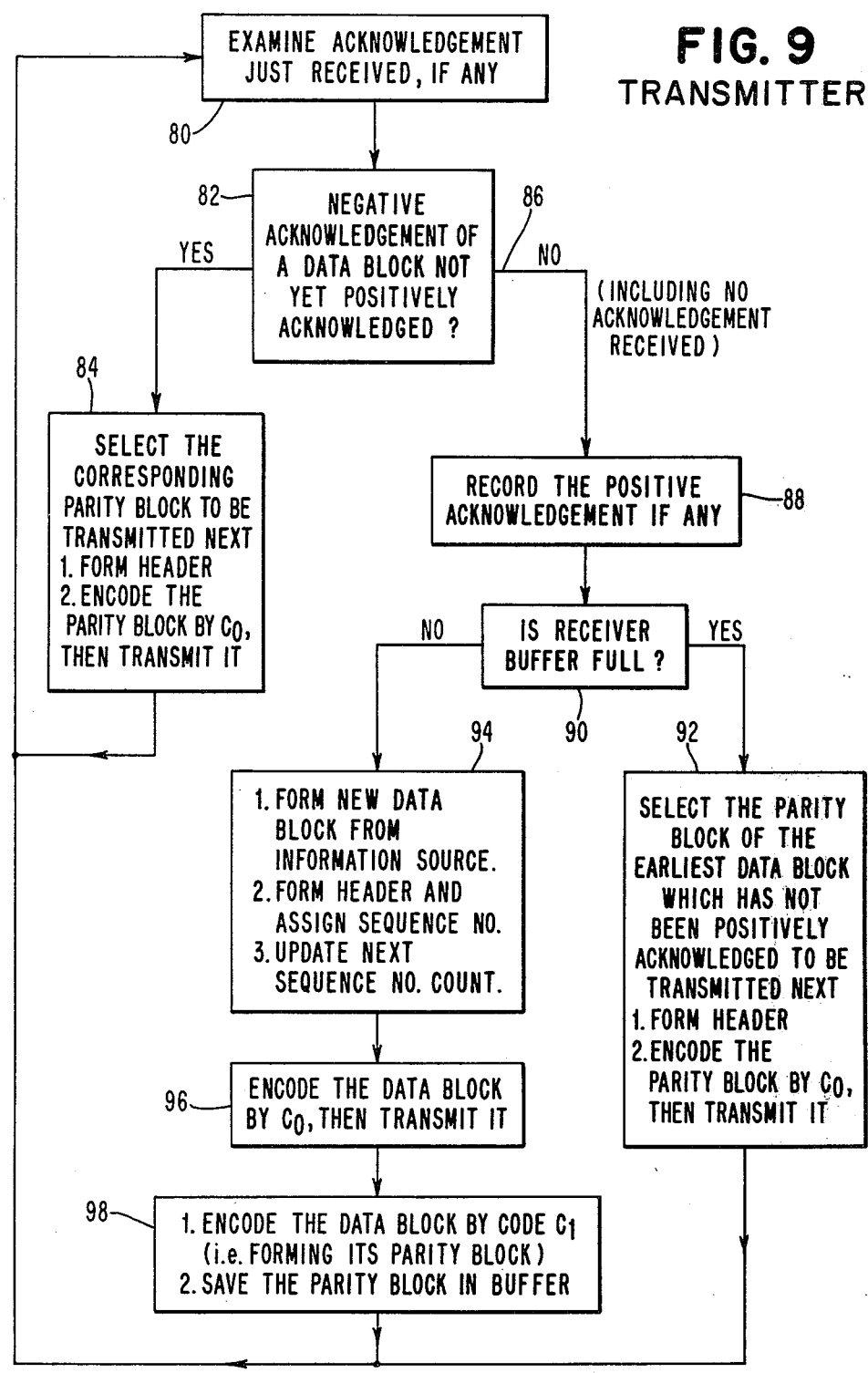
FIG. 9 is a system flow diagram corresponding to the control program for the transmitter.

Appendix A is a PL/1 version of a control program for implementing the control function of the receiver shown in FIG. 5. FIG. 9 is a system flow diagram for the control program of Appendix A for the transmitter.

Appendix B is a PL/1 version of the control program for implementing the control function of the receiver shown in FIG. 7. FIG. 10, comprising parts 10A and 10B, is a flow diagram corresponding to the program set forth in Appendix B for the receiver.

Referring to FIG. 9, the control program of the transmitter examines the acknowledgement received, if any, as shown in flow block 80. If a negative acknowledgement of a data block not yet positively acknowledged is received at 82, the control program in control circuit 22 shown in FIG. 5 and the partity block selection circuit 28 cause selection at 84 of the corresponding parity block to be next transmitted. A header is formed and the parity block is encoded by encoder $C_O$ shown in FIG. 5 and then transmitted. Where there is no negative acknowledgement of a data block not yet positively acknowledged as indicated on line 86 in FIG. 9, the positive acknowledgement, if any, is recorded at 88. If the receiver buffer is full at 90, the control program in control circuit 22 selects and removes from the buffer the parity block of the earliest data block which has not been positively acknowledged. A header is formed and the parity block is encoded by $C_0$ and transmitted as indicated by step 92. On the other hand, if the receiver buffer is not full at 90, then a new data block is formed at 94 from the information source, a header is formed and a sequence number is assigned thereto, and the next sequence number count is updated. The new data block is encoded at 96 by $C_0$, and then transmitted.

Also, the data block is encoded at 98 by $C_1$ to form its parity block and the parity block is stored in the buffer. The process is repeated as shown at block 80 in FIG. 9.

Figure 10B:
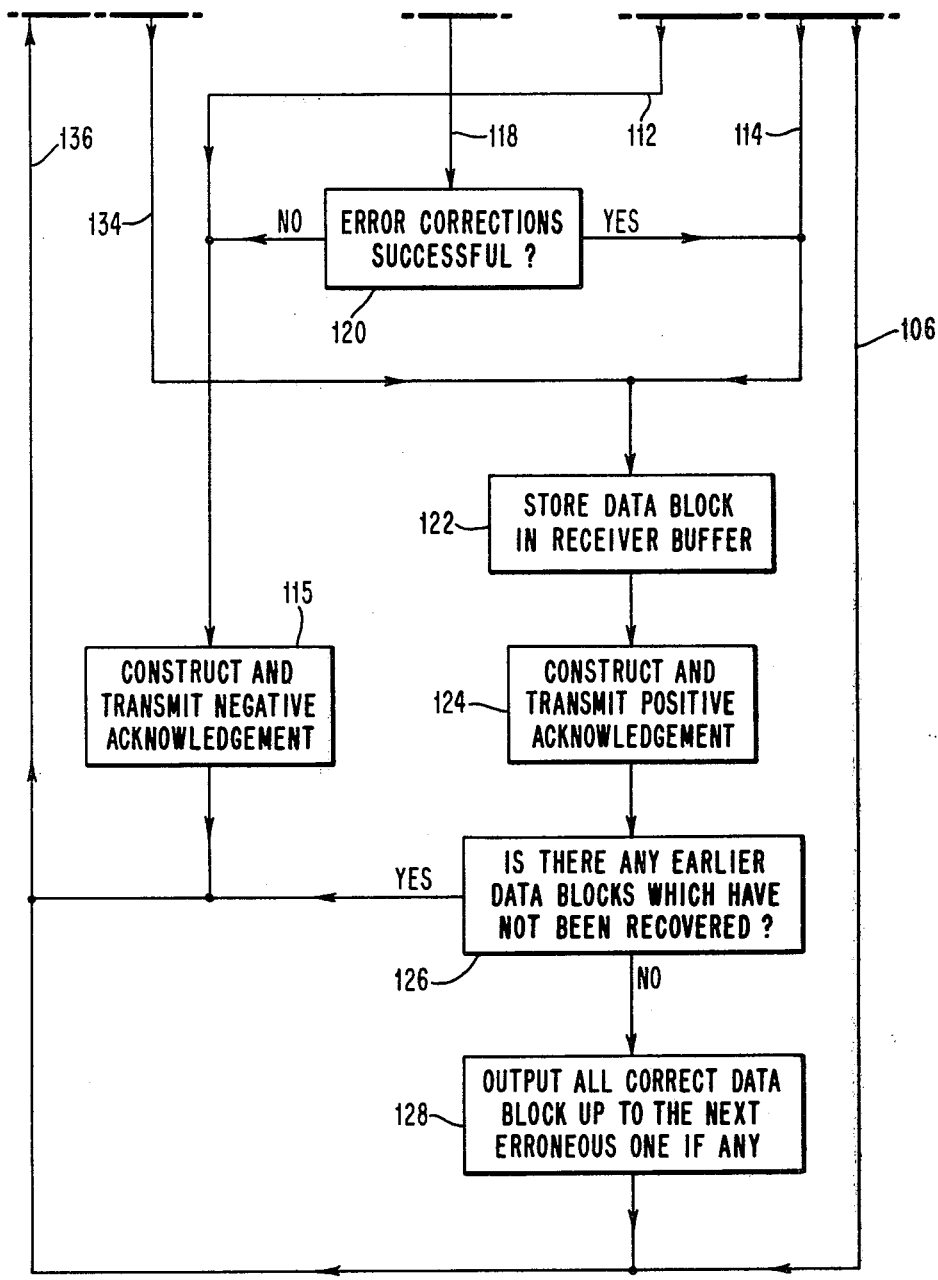
FIG. 10 comprised of FIGS. 10A and 10B constitute a system flow diagram corresponding to the control program for the receiver.

Referring to FIGS. 10A and 10B, the control program of the receiver receives the data block or parity block at 100 and provides the status of each block in the input buffer. A sequence number of each block in the input buffer is provided. If there has been retransmission of a positively acknowledged data block at 102, a positive acknowledgement is constructed and transmitted at 104 on line 106. If there has not been retransmission of a positively acknowledged data block at 102, than an indication of a data block or parity block is provided at 108.

As mentioned above, the receiver checks the validity of each incoming data block based on the error detecting code $C_0$ as shown at 110, and when a received data block is detected in error at 112, a negative acknowledgement (NAK) is sent to the transmitter at 115. If the data block is correctly received at 114, or if error correction has been successful at 116, 118, and 120, the data block is stored in the receiver buffer at 122 and a positive acknowledgement is constructed and transmitted at 124. If there is any earlier data blocks which have not been recovered at 126, the negative acknowledgement is sent to the transmitter. If there are no earlier data blocks which have not been recovered, then all correct data blocks are outputted at 128 up to the next erroneous one, if any.

When a first parity block is correctly received at 130, the data block is recovered from the parity block by inversion at 132, and the data block is stored in the receiver buffer at 122 via line 134.

If the parity block is detected in error at 130, then such erroneous parity block and the erroneous data block stored in the buffer at 116 are used together for correcting errors in the data block by the $C_1$ decoder. Once the error corrections are successful and the data is recovered, that the receiver stores the good data blocks at 122.

If the receiver fails to recover the data block from the first received parity block at 120, a negative acknowledgement is constructed at 115 and sent to the transmitter as shown by line 136.

Figure 11:
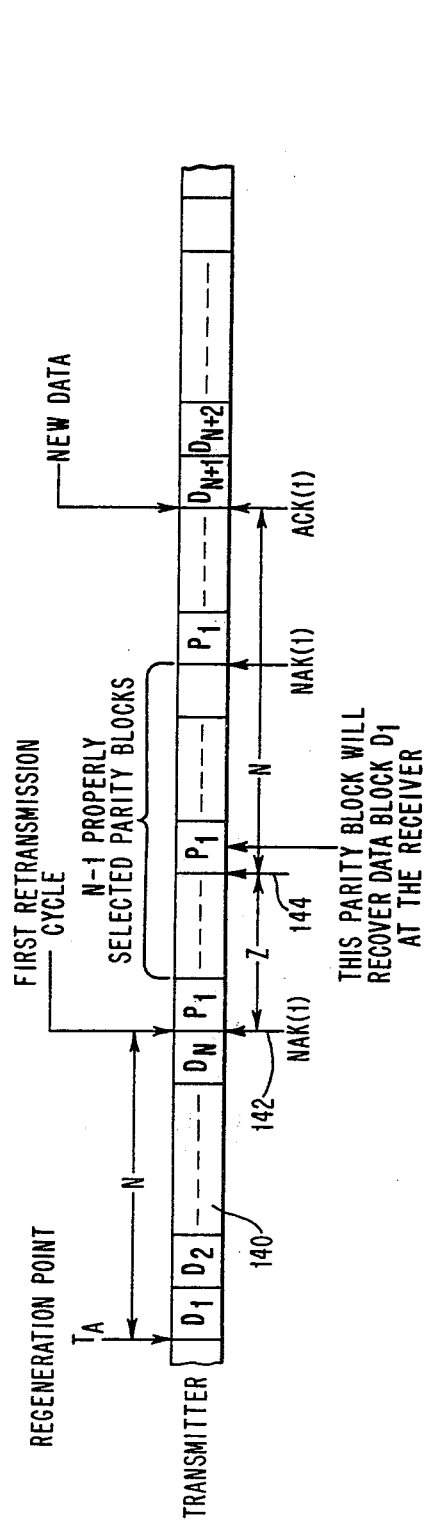
FIGS. 11A and 11B are the data and parity block arrangement at a transmitter using the selective parity retransmission (SPREC) scheme, illustrating the recovery period for an erroneously received data block.
Figure 2:
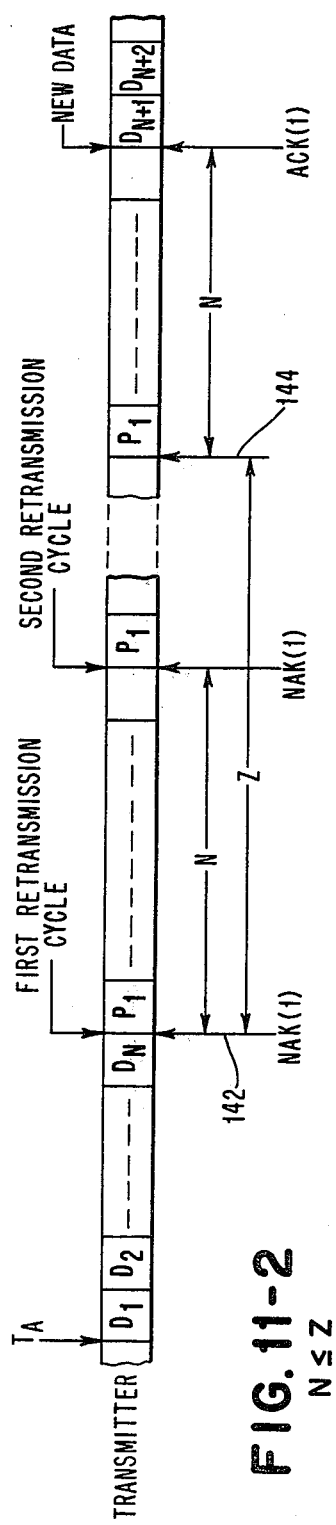

The present invention results in a high system throughput over a wide range of channel error rates. FIGS. 11A and 11B are data and parity block arrangements at a transmitter using the selective parity retransmission scheme (SPREC) for the purpose of illustrating the recovery period of the transmitter. Here, it is assumed that the transmitter has infinite number of data blocks to be transmitted. The transmitter is said to be in the normal state if the next N blocks to be transmitted are new data blocks 140. Let $T_A$ be an instant at which the transmitter is in the normal state and begins to transmit a data block, say $(D_j,Q_j)$. We regard this time instant $T_A$ as a regeneration point if the transmission of $(D_j,Q_j)$ becomes unsuccessful. That is, if errors are detected in $(D_j,Q_j)$ at the receiver. From one regeneration point to the next regeneration point, the transmitter goes through a sequence of events. The stochastic description of the events between a given pair of adjacent regeneration points is identical and independent of the description of the events between every other pair of adjacent regeneration points. Let X be the total number of blocks, data or parity, transmitted during the interval between two adjacent regeneration points. Let Y be the number of data blocks that are accepted by the receiver and delivered to the user during the same interval. Clearly, X and Y are two random variables. Let E[X] and E[Y] be the expectations of X and Y respectively. Then, the throughput of a communication system using the SPREC scheme of the present invention is defined by $$\eta_{SPREC} \stackrel{\Delta}{=} \frac{E[Y]}{E[X]} . \quad (4)$$

Let Z be the total number of parity blocks transmitted during the interval between the instant indicated at 142 at which the first NAK(j) for the erroneously received data block $\overline{D}_j$ is received and the instant indicated at 144 at which the first parity block $P(D_j)$ that will recover $D_j$ at the receiver is to be transmitted as illustrated in FIGS. 11A and 11B. Z is a random variable and is referred to as the recovery period for the erroneously received data block. The throughput $\eta_{SPREC}$ depends on E[Z]. FIG. 11A shows the recovery period Z where $0 \leq Z < N$. FIG. 11B shows the recovery period Z where $N \leq Z$.

Let p be the probability that a block, data or parity, will be successfully received. Let $q_1$ be the conditional probability that a data block $D_l$ is successfully recovered from the first received parity block $P(D_l)$ either by inversion or by decoding based on the code $C_1$, given that errors are detected in the received data block $\overline{D}_l$. Let $q_2$ be the conditional probability that a data block $D_l$ is successfully recovered from the second received parity block $\overline{P}(D_l)$, given that errors are detected in $\overline{D}_l$ and that the first received parity block $\overline{P}(D_l)$ fails to recover $D_l$ but detects the presence of errors in $\overline{D}_l$ and the first $\overline{P}(D_l)$. It is clear that $q_1 \geq q_2 \geq p$.

Now, we define the following parameters:

$$\alpha = p + (L - p)q_1,$$
$$\beta = (1 - p)(1 - pq_1)^{N-1},$$
$$\delta = \frac{(1 - q_1)(1 - q_2)}{1 - p},$$
$$\tau = \frac{(1 - q_1)(q_2 - p)}{1 - p}.$$

Then the average recovery period E[Z] for an erroneously received data block can be upper bounded in Equation 5 as follows:

$$E[Z] \leq \overline{Z}_1 + \frac{1 - R_1}{R_2}(N + \mu) \quad (5)$$

where $$\overline{Z}_1 = \frac{\delta}{p^2}\{1 - [1 + (N - 1)p^2](1 - p^2)^{N-1}\}$$
$$+ \frac{\tau}{p}\{1 - [1 + (N - 1)p](1 - p)^{N-1}\},$$

$$R_1 = q_1 + \delta[1 - (1 - p^2)^{N-1}] + \tau[1 - (1 - p)^{N-1}],$$
$$R_2 = 1 - \beta,$$

$$\mu = \frac{1 - p}{pq_1}\{1 - [1 + (N - 1)pq_1](1 - pq_1)^{N-1}\}.$$

Let $\lambda$ denote the upper bound on E[Z] given by Equation (5). Then the throughput of SPREC can be lower bounded as below:

$$\eta_{SPREC} \geq \frac{1 - q_1\alpha^{N-1}}{1 - q_1\alpha^{N-1} + (1 - \alpha)(N + \lambda)} . \quad (6)$$

It is noted that a more detailed derivation of the throughput equations and their analysis is described in IBM Research Report RC 7591 by the co-inventors S. Lin and P. S. Yu in their report entitled, "SPREC-An Effective Hybrid-ARQ Scheme" published in December, 1980.

From the above, it can be seen that, in order to maintain high throughput, $\alpha$ must be kept large and $\lambda$ must be kept small. The parameter $\alpha$ depends on probabilities p and $q_1$. When the channel error rate is very low, p is close to one and $\alpha \approx p$. However, p decreases rapidly as the channel error rate increases. The probability $q_1$ depends on the error-correcting capability of the code $C_1$. When p becomes small, if $q_1$ maintains large, the parameter $\alpha$ would maintain large. The upper bound $\lambda$ on the average recovery period depends on p, $q_1$, and $q_2$. If p is large, $\lambda$ would be small. If p becomes small but $q_1$ and $q_2$ maintain large, $\lambda$ will be maintained small.

The lower bound on the throughput $\eta_{SPREC}$ given by Equation (6) applies to channels with either random or/an burst errors. It can be evaluated if p, $q_1$, and $q_2$ are known. In order to see the significant gain in the throughput of the SPREC over the Go-Back-N ARQ, we assume that the channel is a binary symmetric channel (BSC) with bit error rate $\epsilon$ (or the transition probability). Since the probability of an undetected error of $C_0$ is very small for sufficient large $n-k$ [see Equation (3)], we have $$p \approx P_c = (1-\epsilon)^n \quad (7)$$

which is simply the probability that a block is received correctly. The probability $q_1$ is given below:

$$q_1 = p + \frac{1}{1-p}\left\{\sum_{i=0}^{t}\binom{2k}{i}\epsilon^i(1-\epsilon)^{2k-i} + (1-\epsilon)^{2n}\right.$$
$$\left. -2(1-\epsilon)^n\left[(1-\epsilon)^k + \sum_{i=1}^{t}\binom{k}{i}\epsilon^i(1-\epsilon)^{k-i}\right]\right\} \quad (8)$$

To derive an exact expression for the conditional probability $q_2$ is tedious, however, a lower bound on $q_2$ can be obtained easily. This lower bound is given below:

$$q_2 \geq p + \frac{1}{(1-p)(1-q_2)}\sum_{i=1}^{t-1}f_iS_{t-i}(1-f_0-S_{t-i}) \quad (9)$$

where $$f_i = \binom{k}{i}\epsilon^i(1-\epsilon)^{k-i}, S_j = \sum_{i=1}^{j}f_i.$$

Using the probabilities p, $q_1$, and $q_2$ given above, the lower bound on the throughput $\eta_{SPREC}$ given by Equation (6) can be evaluated. Using a lower bound on $q_2$ will increase the parameter $\lambda$ and thus will decrease the lower bound $\eta_{SPREC}$. For various parameters, n, k, t, and N, the throughput $\eta_{SPREC}$ of SPREC and the throughput $\eta_{GBN}$ of the conventional Go-Back-N ARQ are plotted in FIGS. 12 and 13 where simulation results are also included. For all the cases, the number of parity digits of $C_0$ is chosen to be 24 as shown below.

Figure 12:
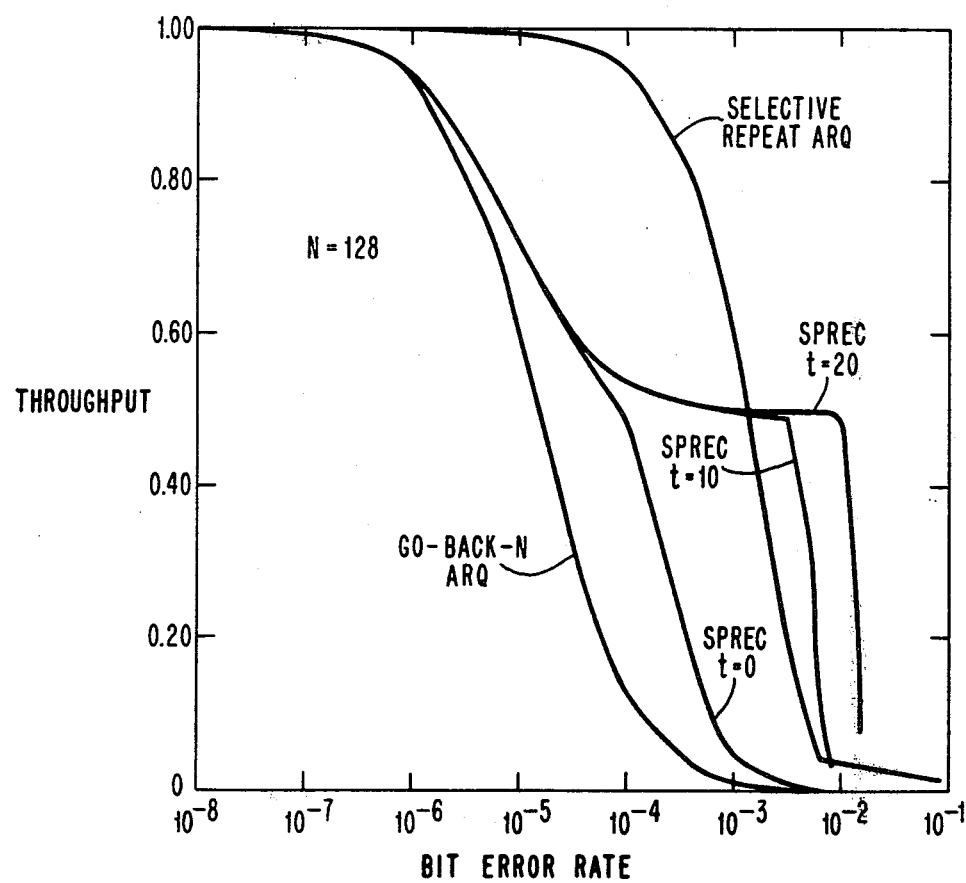
FIGS. 12 and 13 are graphs showing the plots of the throughput of the SPREC system, and the throughputs of the conventional automatic-repeat-request (ARQ) schemes for comparison purposes.

FIG. 12 shows a lower bound throughput of the SPREC using a (525,500) cyclic code as $C_0$ and a (1000,500) block code as $C_1$ with N=128 and t=0, 10 and 20 the symbols Δ, 0 and X are simulation results. The throughputs of the conventional Go-Back-N ARQ and Selective-Repeat ARQ are also included for comparison.

Figure 13:
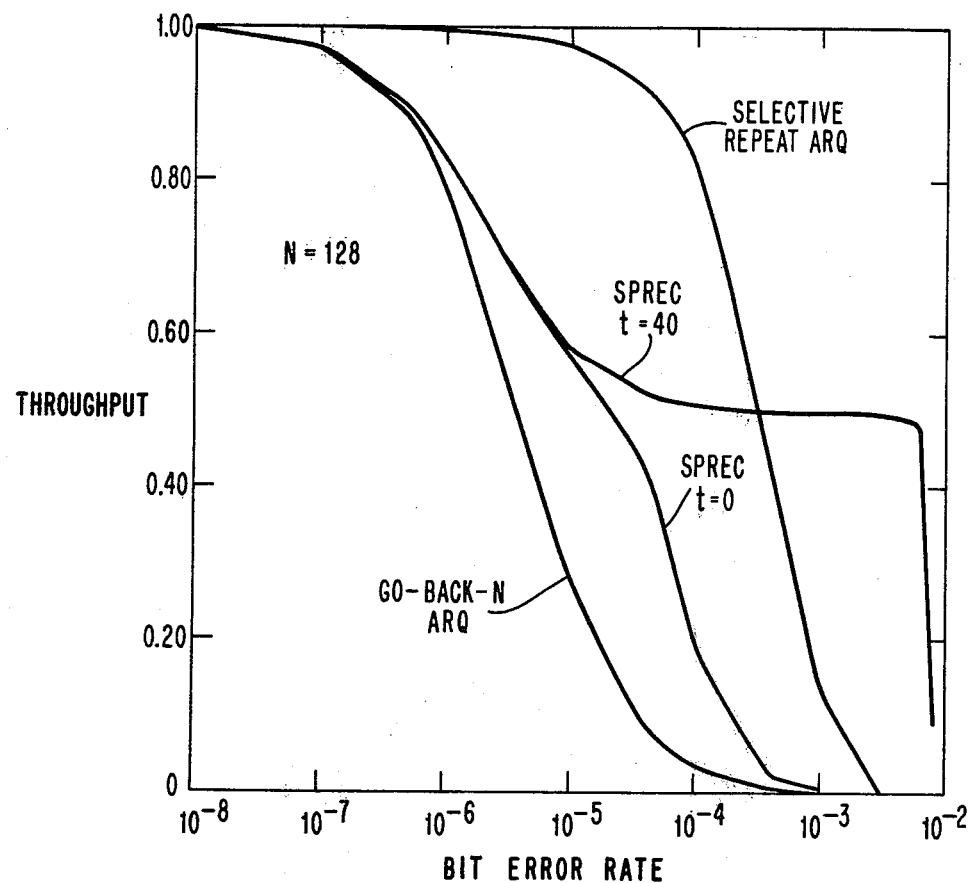

FIG. 13 shows a lower bound throughput of the SPREC using a (2024,2000) code as $C_O$ and a (4000,2000) code as $C_1$ with N=128 and t=0 and 40 where the symbols Δ and X are simulation results. The throughputs of the conventional Go-Back-N ARQ and Selective-Repeat ARQ are also included for comparison.

code is also invertible and has minimum distance at least 111. Therefore, in plotting the lower bound on throughput of the SPREC, we use the following two pairs of $C_0$ and $C_1$:

| FIG. 12 | | FIG. 13 | |
|---|---|---|---|
| k = 500 | | k = 2000 | |
| $C_0$ (n,k) | $C_1$ (2k,k) | $C_0$ (n,k) | $C_1$ (2k,k) |
| (524,500) | (1000,500) | (2024,2000) | (4000,2000) | where $C_0$ is a shortened cyclic code with 24 parity digits.

From the throughput plots shown in FIGS. 12 and 13, it can be seen that the SPREC provides significant gain in throughput over the conventional Go-Back-N ARQ for various n, k, t, where N=128. The throughput of the Go-Back-N- ARQ falls rapidly to zero as the bit error rate increases. However, the throughput of SPREC maintains at least 50% as long as the bit error rate $\epsilon < t/2k$. Even for t=0, the SPREC provides significant improvement in throughput over the Go-Back-N ARQ.

While the invention has been particularly shown and described with reference to preferred embodiments thereof, it will be understood by those skilled in the art that the foregoing and other changes in form and details may be made therein without departing from the spirit and scope of the invention.

Two block codes are used for $C_1$ in the FIGS. 12 and 13, respectively. One is a (1000,500) shortened BCH code $C_1$ which is obtained from the (1023,523) BCH code by deleting 23 information digits. This is described by W. W. Peterson and E. J. Weldon, Jr. in their textbook entitled, "Error-Correcting Codes", 2nd Edition, published by MIT Press, 1972. The shortened BCH code is also described by S. Lin in his textbook entitled, "An Introduction to Error-Correcting Codes", published by Prentice-Hill, 1970. The shortened BCH code is invertible and its minimum distance, $d_{min}$, is at least 111. This code is used to correct t for fewer errors and simultaneously to detect $d(d>t)$ or fewer errors where $t+d<111$. If the code is used for correcting t=10 of fewer errors, it is capable of detecting 100 or fewer errors over a block of 1000 digits. The other block code used for $C_1$ is a (4000,2000) code (FIG. 13) which is obtained by interleaving the (1023,523) BCH code with degree 4 and then deleting 92 information digits. This

APPENDIX A

```
TRANS:PROC(DBLK,TOTAL,N,L);
/**********************************************/
/*                                             */
/*     THIS PROCEDURE IMPLEMENTS THE CONTROL   */
/*         FUNCTION OF THE TRANSMITTER         */
/*                                             */
/**********************************************/

DCL TOTAL FIXED BINARY, /* TOTAL NUMBER OF DATA BLOCKS
                              TO BE TRANSMITTED      */
       L     FIXED BINARY, /* NUMBER OF BITS IN EACH DATA
                              BLOCK       */
       DBLK(*) BIT(*),     /* STREAMS OF DATA BLOCKS
                              TO BE TRANSMITTED      */
```

```
    N       FIXED BINARY;  /* NUMBER OF DATA BLOCKS THAT
                               CAN BE TRANSMITTED IN A
                               ROUND TRIP DELAY       */

DCL 1 ACK,      /* RECORD ON ACKNOWLEDGEMENT   */
      2 ACKTYP FIXED BINARY,  /* TYPE OF ACKNOWLEDGEMENT */
      2 ACKPT  FIXED BINARY;  /* SEQUENCE NO. OF ACKNOWLEDGED
                                  BLOCK    */

DCL BUFFER(2*N) BIT(L),       /* OUTPUT BUFFER */
    STAT(2*N) FIXED BINARY;   /* STATUS OF EACH BLOCK IN
                                 OUTPUT BUFFER   */

DCL  1 OUTBLK,    /* TEMPLATE OF A TRANSMITTED BLOCK */
       2 HEADER,  /* HEADER PORTION   */
         3 FLG    FIXED BINARY,  /* INDICATION OF DATA OR
                                    PARITY BLOCK    */
         3 SEQ    FIXED BINARY,  /* SEQUENCE NUMBER */
       2 INFORM   BIT(L);        /* INFORMATION PORTION */

DCL (INDX,CINDX,COUNT,ACKCNT)   FIXED BINARY;
    /*   INDX  : SEQUENCE NUMBER OF NEXT DATA BLOCK
                 TO BE TRANSMITTED
         CINDX : SEQUENCE NUMBER OF A PREVIOUSLY
                 TRANSMITTED DATA BLOCK WHICH IS
                 N BLOCKS AHEAD OF THE DATA BLOCK
                 POINTED BY INDX
         COUNT : NUMBER OF DATA BLOCKS TRANSMITTED
         ACKCNT: NUMBER OF DATA BLOCKS SUCCESSFULLY
                 TRANSMITTED                        */

DCL I FIXED BINARY; /* TEMPORARY  VARIABLE  */

DCL (MOD,STRING) BUILTIN;

DCL PACK  FIXED BINARY INIT (1),
    NACK  FIXED BINARY INIT (2),
    NOACK FIXED BINARY INIT (3),
    /* DEFINE CONSTANT:
            PACK: POSITIVELY ACKNOWLEDGED
            NACK: NEGATIVELY ACKNOWLEDGED
            NOACK: NOT YET ACKNOWLEDGED       */
    PB  FIXED BINARY INIT (1),
    DB  FIXED BINARY INIT (2);

/* DEFINE CONSTANT:
            DB: DATA BLOCK
            PB: PARITY BLOCK                 */

DCL PARITY ENTRY;
    /* ROCEDURE "ENTRY" ACCEPTS AS AN ARGUMENT THE
       DATA BLOCK, 'DATABLK', AND RETURNS ITS PARITY
       BLOCK, PARITYBLK, AS ANOTHER ARGUMENT, BASED ON
       SOME HALF RATE CODE.                          */
```

```
WRITEDATA: PROC;
         /* THIS PROCEDURE ACCEPTS THE BLOCK STORED
            IN 'OUTBLK', AND TRANSMITS IT AS A BIT
            STRING.                                       */

DCL  1 OUTSTG,  /* TEMPLATE OF A TRANSMITTED BLOCK */
                2 HEADERSTG,          /* HEADER PORTION    */
                   3 FLGSTG  BIT(31),   /* INDICATION OF DATA
                                           OR PARITY BLOCK */
                   3 SEQSTG  BIT(31),   /* SEQUENCE NUMBER  */
                2 INFORMSTG BIT(L); /* INFORMATION PORTION */

DCL  OUTSTRING BIT(L+62);

FLGSTG=FLG;
         SEQSTG=SEQ;
         INFORMSTG=INFORM;
         OUTSTRING=STRING(OUTSTG);

PUT DATA(OUTSTRING);  /* TRANSMIT DATA OR PARITY
                                           BLOCK           */
         END;

READACK: PROC;
         /* THIS PROCEDURE READS IN THE NEXT ACKNOW-
            LEDGEMENT FROM THE RECEIVER, AND
            RECORDS THE ACKNOWLEGEMENT IN 'ACK'.
                                                          */
         DCL 1 ACKSTG,         /* RECORD ON ACKNOWLEDGEMENT */
              2 TYPSTG BIT(31),   /* TYPE OF ACKNOWLEDGEMENT */
              2 PTSTG BIT(31);    /*   SEQUENCE NO. OF
                                        ACKNOWLEDGED BLOCK  */

DCL ACKSTRING BIT(62);

GET DATA(ACKSTRING);

STRING(ACKSTG)=ACKSTRING;
         ACKTYP=TYPSTG;
         ACKPT=PTSTG;
         END;

/* INITIALIZATON */
         DO I=1 TO 2*N;
            STAT(I)=PACK;
            END;

ACKCNT=0;
         INDX,COUNT=1;
         ACKTYP=PACK;
         ACKPT=N+1;

/*  CONTROL ROUTINE OF THE TRANSMITTER   */
```

```
DO WHILE (ACKCNT < TOTAL);
   /* EXAMINE NEXT ACKNOWLEDGEMENT, IF ANY */
   IF COUNT > N  THEN CALL READACK;

IF (ACKTYP=NACK) & (STAT(ACKPT) ¬= PACK)  THEN
      DO; /* THE NEGATIVELY ACKNOWLEDGED BLOCK HAS NOT
             YET BEEN RECOVERED   */
      STAT(ACKPT)=NACK;  /* RECORD THE NEGATIVE ACK  */
      /* RECOVER THE BLOCK JUST NEGATIVELY ACK'ED  */
      /* CONSTRUCT THE BLOCK TO BE TRANSMITTED  */
      SEQ=ACKPT;
      FLG=PB;
      INFORM=BUFFER(ACKPT);
      /* INITIATE BLOCK TRANSMISSION */
      CALL WRITEDATA;
      END;
   ELSE DO;
      IF (ACKTYP=PACK) & (STAT(ACKPT) ¬= PACK)  THEN
         DO;
         /*  RECORD POSTIVE ACK  */
         STAT(ACKPT)=PACK;
         ACKCNT=ACKCNT+1;
         END;
      CINDX=MOD(INDX-N,2*N);
      IF STAT(CINDX)=PACK  THEN
         DO; /* NO BLOCKING  */
         /* TRANSMIT NEW DATA BLOCK, IF ANY  */
         IF COUNT <= TOTAL  THEN
            DO;
            /* CONSTRUCT THE BLOCK TO BE TRANSMITTED */
            SEQ=INDX;
            FLG=DB;
            INFORM=DBLK(COUNT);
            /* INITIATE BLOCK TRANSMISSION  */
            CALL WRITEDATA;
            /* STORE THE  PARITY  BLOCK  OF  THE     */
            /* TRANSMITTED DATA BLOCK IN THE BUFFER  */
            CALL PARITY(DBLK(COUNT),BUFFER(INDX));
            STAT(INDX)=NOACK;

/* UPDATE  BOOKKEEPING  */
            COUNT=COUNT+1;
            IF INDX ¬= 2*N  THEN INDX=INDX+1;
                            ELSE INDX=1;
            END;
         END;
      ELSE
            DO;/* RECOVER THE EARLIEST ERRONEOUS DATA BLOCK  */
            /* CONSTRUCT THE BLOCK TO BE TRANSMITTED  */
            SEQ=INDX;
            FLG=PB;
            INFORM=BUFFER(CINDX);
            /*  INITIATE BLOCK TRANSMISSION  */
            CALL WRITEDATA;
            END;
         END;
      END;
END;
```

APPENDIX B

```
RECV:PROC(N,L);
    /***********************************************************/
    /*                                                         */
    /*        THIS PROCEDURE IMPLEMENTS THE CONTROL            */
    /*        FUNCTION OF THE RECEIVER                         */
    /*                                                         */
    /***********************************************************/

DCL L      FIXED BINARY, /*   NUMBER OF BITS IN EACH DATA
                                  BLOCK                         */
        N      FIXED BINARY; /*   NUMBER OF DATA BLOCKS THAT
                                  CAN BE TRANSMITTED IN A
                                  ROUND TRIP DELAY              */

DCL 1 ACK,         /*         RECORD ON ACKNOWLEDGEMENT     */
         2 ACKTYP FIXED BIN(31), /* TYPE OF ACKNOWLEDGEMENT    */
         2 ACKPT  FIXED BIN(31); /* SEQUENCE NO. OF ACKNOWLEDGED
                                    BLOCK                       */

DCL BUFFER(N) BIT(L),        /*     INPUT BUFFER            */
        STAT(N) FIXED BINARY,    /* STATUS OF EACH BLOCK IN
                                    INPUT BUFFER                */
        SEQN(N) FIXED BINARY;    /* SEQUENCE NO. OF EACH BLOCK
                                    IN INPUT BUFFER             */

DCL 1 INBLK,       /*  TEMPLATE OF A RECEIVED BLOCK         */
         2 HEADER,     /*  HEADER PORTION                       */
           3 FLG    FIXED BINARY,    /* INDICATION OF DATA OR
                                        PARITY BLOCK            */
           3 SEQ    FIXED BIN(31),   /* SEQUENCE NUMBER         */
         2 INFORM   BIT(L);           /* INFORMATION PORTION    */

DCL (FIRST,INDX)   FIXED BINARY;
        /*  FIRST : SEQUENCE NUMBER OF NEXT DATA
                    BLOCK TO BE OUTPUT
            INDX  : SEQUENCE NUMBER OF NEXT DATA BLOCK
                    TO BE RECEIVED                              */

DCL I FIXED BINARY,              /*   TEMPORARY VARIABLE    */
        (DIST,RECV,RSLT) FIXED BINARY;

DCL (MOD,STRING)  BUILTIN;

DCL PACK   FIXED BINARY INIT (1),
        NACK   FIXED BINARY INIT (2),
        OUTPUT FIXED BINARY INIT (3),
        /* DEFINE CONSTANT:
                PACK: POSITIVELY ACKNOWLEDGED
                NACK: NEGATIVELY ACKNOWLEDGED
                OUTPUT: OUTPUT TO USER FILE                     */
        PB  FIXED BINARY INIT (1),
        DB  FIXED BINARY INIT (2),
        /*  DEFINE CONSTANT:
                DB:  DATA BLOCK
                PB:  PARITY BLOCK                               */
        SUCC FIXED BINARY INIT(1);
        /*  DEFINE CONSTANT:
                SUCC: RECEIVED BLOCK ERROR-FREE OR RECOVERED    */
```

```
          2 PTSTG  BIT(31);   /* SEQUENCE NO. OF
                                    ACKNOWLEDGED BLOCK   */
     DCL ACKSTRING BIT(62);

TYPSTG=ACKTYP;
     PTSTG=ACKPT;
     ACKSTRING=STRING(ACKSTG);

PUT DATA(ACKSTRING);   /*   RETURN ACKNOWLEDGEMENT  */

END;

/* INITIALIZATON */
DO I=1  TO N;
   STAT(I)=OUTPUT;
   END;

FIRST=1;

OPEN FILE(RECFILE) OUTPUT;

/*     CONTROL ROUTINE OF THE RECIEVER         */

/*  READ IN DATA OR PARITY BLOCK FROM INPUT CHANNEL */
CALL READBLK;

IF  SEQ <= N  THEN   INDX=SEQ;
              ELSE   INDX=SEQ-N;

DIST=MOD(SEQ-SEQN(FIRST), 2*N);

IF DIST < N  THEN
   DO; /* SEQUENCE NUMBER WITHIN RANGE  */
   IF (STAT(INDX) = NACK) | (SEQN(INDX) ¬= SEQ) THEN
      DO; /* NOT A RETRANS. OF A POSITIVELY ACKED BLOCK */
      IF  FLG = PB  THEN
         DO; /* PROCESSING OF PARITY BLOCK */
         IF RECV = SUCC   THEN
            DO;
            CALL INVERSE(INFORM);
            RSLT=SUCC;
            END;
         ELSE  CALL CORRECT(INDX,INFORM,RSLT);

IF RSLT = SUCC  THEN
            DO;
            STAT(INDX)=PACK;
            BUFFER(INDX)=INFORM;
            SEQN(INDX)=SEQ;
            END;
         END;
      ELSE  /*  PROCESSING OF DATA BLOCK  */
         DO;
         BUFFER(INDX)=INFORM;
         SEQN(INDX)=SEQ;
         IF RECV=SUCC THEN STAT(INDX)=PACK;
                      ELSE STAT(INDX)=NACK;
```

```
DCL (INVERSE,CORRECT,CRCCHK) ENTRY;
    /* PROCEDURE "INVERSE" INVERTS THE PARITY BLOCK
       BACK TO THE ORIGINAL DATA BLOCK.
       THE ONLY PARAMETER IS THE PARITY BLOCK WHICH
       WILL BE CONVERTED INTO THE DATA BLOCK UPON
       RETURN.

PROCEDURE "CORRECT" TRIES TO USE THE PARITY BLOCK
       TO CORRECT THE ERROR IN THE DATA BLOCK.
       THE 1ST PARAMETER IS THE DATA BLOCK,
       THE 2ND PARAMETER IS THE PARRITY BLOCK,
       AND THE 3RD PARAMETER IS SET BY "CORRECT" TO
       INDICATE THE SUCCFULNESS OF THE ERROR CORRECTION.

PROCEDURE "CRCCHK" PERFORMS CRC CHECK ON THE RECEIVED
       BLOCK.
       THE ONLY PARAMETER IS AN INDICATER SET BY "CRCCHK"
       TO INDICATE WHETHER THE BLOCK IS CONSISTENT WITH
       THE CRC.                                              */

DCL RECFILE  FILE;   /* RECEIVER OUTPUTS DATA BLOCKS
                        INTO FILE "RECFILE"                  */

READBLK: PROC;
       /*  THIS PROCEDURE READS IN THE BIT STRING
           FROM INPUT CHANNEL, AND MAPS EACH
           SUBSTRING INTO THE CORRESPONDING FIELD.
                                                             */
       DCL  1 INSTG,      /* TEMPLATE OF A RECEIVED STRING   */
              2 HEADERSTG,            /*   HEADER PORTION    */
                3 FLGSTG BIT(31),     /* INDICATION OF DATA OR
                                         PARITY BLOCK        */
                3 SEQSTG BIT(31),     /*   SEQUENCE NUMBER   */
              2 INFORMSTG  BIT(L),    /* INFORMATION PORTION */
              2 CRCSTG BIT(24);

DCL INPUTSTRING BIT(L+86);

GET DATA(INPUTSTRING);/* READ IN DATA OR PARITY BLOCK */

STRING(INSTG)=INPUTSTRING;
       FLG=FLGSTG;
       SEQ=SEQSTG;
       INFORM=INFORMSTG;

CALL CRCCHK(RECV);      /* CRC CHECK, "RECV" WILL BE
                                  SET BY PROCEDURE CRCCHK
                                  TO INDICATE WHETHER THE BLOCK
                                  IS CORRECTLY RECEIVED.     */
       END;

WRITEACK: PROC;
        /* THIS PROCEDURE  RETURNS THE NEXT ACKNOW-
           LEDGEMENT TO THE TRANSMITTER.
                                                             */
         DCL 1 ACKSTG,       /* RECORD ON ACKNOWLEDGEMENT    */
              2 TYPSTG BIT(31),    /* TYPE OF ACKNOWLEDGEMENT */
```

```
            END;
        END;

/* RETURN ACKNOWLEDGEMENT TO TRANSMITTER */
IF STAT(INDX)=NACK THEN ACKTYP=NACK;
                  ELSE ACKTYP=PACK;
ACKPT=SEQ;
CALL WRITEACK;

/* OUTPUT DATA BLOCKS TO USER FILE IF NOT BLOCKED */
IF INDX=FIRST THEN
    DO;
    DO  WHILE (STAT(FIRST)=PACK);
        PUT FILE(RECFILE) DATA(BUFFER(FIRST));
                        /* OUTPUT DATA BLOCK  */
        STAT(FIRST)=OUTPUT;

IF FIRST ¬= N  THEN FIRST=FIRST+1;
                       ELSE FIRST=1;
        END;
    END;
 END;
END;
```

We claim:

1. A method for controlling transmission errors in digital data communication systems, comprising:
   sending, at a transmitter, data blocks with parity digits for error detection,
   detecting, at a receiver, the presence of errors in received data blocks, sending a negative acknowledgement to said transmitter, and storing the erroneous data block, and
   retransmitting properly selected parity blocks, and not the erroneously received data block, to said receiver for correcting errors in said erroneously received data block.

2. Method as recited in claim 1, wherein said parity blocks are formed based on a half-rate invertible code in which only the parity digits of a code word are used to determine, by an inversion process, the corresponding information digits.

3. Method as recited in claim 1, wherein said transmitter, upon receiving a negative acknowledgement, retransmits a parity block of n digits consisting of a first part of k parity digits based on both the original k information digits and a half-rate invertible code $C_1$, and a second part of n-k partity digits based on both the k information digits and a (n,k) high rate cyclic code $C_0$.

4. Method as recited in claim 1, wherein said receiver, upon detecting an erroneously received data block, stores said data block which is subsequently used with its corresponding parity block to recover the correct data block.

5. Method as recited in claim 1, wherein said data blocks are checked by the receiver using a high rate cyclic code $C_0$ for error detection.

6. Method as recited in claim 1, wherein said parity blocks are based on an invertible half-rate (2k,k) code $C_1$.

7. Method as recited in claim 1, wherein each of said parity blocks consists of a first part P(D) comprising k parity digits which are formed based on the original k information digits D and a half-rate (2k,k) invertible code $C_1$, and a second part $Q^{(1)}$ comprising (n−k) parity digits checking on P(D).

8. Method as recited in claim 7, wherein said receiver uses said second part $Q^{(1)}$ *of a received parity block to check the validity of its first part P(D)*.

9. Method as recited in claim 8, wherein saidd receiver employs said first part P(D) of a received parity block to recover the original data block.

10. Method as recited in claim 1, wherein said transmitter, upon receiving a negative acknowledgement, stops transmitting new data blocks and starts retransmitting properly selected parity blocks until said transmitter is notified by said receiver that the information digits of the erroneously received data block has been recovered.

11. Method as recited in claim 10, wherein said transmitter is instructed to send new data blocks after the earliest received erroneous data block is corrected and recovered at the receiver.

12. A method for controlling transmission errors in digital data communication systems, comprising:
sending, from a transmitter, data blocks which are acknowledged at a receiver,
when the presence of errors in one of said data blocks is detected, storing said erroreously received data block at said receiver,
retransmitting from said transmitter a parity block having error correcting capability for the data block stored in said buffer,
whereby the correct information digits in said data block can be recovered from the parity digits in said parity block through an inversion operation.

13. A system for controlling transmission errors in a digital data communication system, comprising:
a transmitter for sending data blocks consisting of information digits and parity digits for error detection, first encoder means for encoding said data blocks, second encoder means for encoding the data blocks to form associated parity blocks, means for storing said parity blocks, a parity block selection circuit for obtaining from said parity block storing means that parity block corresponding to a negatively acknowledged data block, and control gating means responsive to a negative acknowledgement of a data block from a receiver for retransmitting a selected parity block corresponding to said negatively acknowledged data block, and
a receiver including an error detection means for checking the validity of said received data blocks, control means responsive to said error detection means for sending a positive or negative acknowledgement to said transmitter, a data block buffer for storing data blocks which are detected as erroneous, decoding means for recovering the correct data block from the parity digits in said parity block selected for retransmission by said transmitter, said decoding means including both means for selecting from said data block buffer the data block to be corrected, and a decoder having inversion means for recovering the original data block using said parity digits and said selected data block.

14. System as recited in claim 13, wherein said first encoder means at said transmitter employs a high-rate cyclic code which is used for error detection for encoding said data blocks.

15. System as recited in claim 13, wherein said second encoder means at said transmitter employs an invertible half-rate code to encode said data blocks to form associated parity blocks.

16. System as recited in claim 13, further comprising, at the receiver, means for detecting errors in said parity blocks received from said transmitter.

17. System as recited in claim 13, wherein said decoding means in said receiver employs an invertible half-rate code.

18. System as recited in claim 13, wherein said error detection means, in said receiver for checking the validity of received data blocks, employs a high rate cyclic code which is used for error detection.

* * * * *